(12) United States Patent
Gaul

(10) Patent No.: US 11,507,538 B1
(45) Date of Patent: Nov. 22, 2022

(54) OVERLAY FILE SYSTEM FOR CONSTRAINED ENVIRONMENT

(71) Applicant: Amazon Technologies, Inc., Seattle, WA (US)

(72) Inventor: William Gaul, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/913,658

(22) Filed: Jun. 26, 2020

(51) Int. Cl.
*G06F 16/17* (2019.01)
*G06F 16/16* (2019.01)

(52) U.S. Cl.
CPC .......... *G06F 16/173* (2019.01); *G06F 16/168* (2019.01)

(58) Field of Classification Search
CPC .................. G06F 2211/005; G06F 16/2379
See application file for complete search history.

(56) References Cited

U.S. PATENT DOCUMENTS

| | | | | |
|---|---|---|---|---|
| 2013/0205246 | A1* | 8/2013 | Schmidt | G06F 3/0482 715/781 |
| 2013/0282663 | A1* | 10/2013 | Wade | G06F 16/10 707/823 |
| 2016/0321291 | A1* | 11/2016 | Malhotra | G06F 16/196 |
| 2019/0171837 | A1* | 6/2019 | Thoren | G06F 21/6218 |

* cited by examiner

*Primary Examiner* — Angelica Ruiz
(74) *Attorney, Agent, or Firm* — BakerHostetler

(57) ABSTRACT

Implementations for providing services to a constrained environment are described. A user interface may be provided for editing files. The files or data structure storing the files may exceed a storage limitation associated with the user interface. The user interface may represent the data structure comprising the files while only storing data indicating modifications to the file or data structure.

20 Claims, 18 Drawing Sheets

OVERLAY FILE SYSTEM FOR CONSTRAINED ENVIRONMENT

BACKGROUND

A conventional content browser, such as a web browser, allows for versatile programming to implement a variety of different applications. Web based content browsers may have resource constraints, such as store size limitations, due to web based storage availability and security features. Some users, however, may desire to manipulate files in local storage that surpass such resource constraints. Thus, there is a need for more sophisticated and flexible approaches to managing local resources of a user interface.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

The disclosed methods and systems comprise an editor service for a constrained environment. A user interface, such as a file editor interface, may be provided for editing files. The files or data structure storing the files may exceed a storage limitation associated with the user interface. The user interface may represent the data structure comprising the files while only storing data indicating modifications to the file or data structure.

A file system-like data structure stored in a remote location, such as a serverless code repository or code storage repository, may be configured as a lower layer of an overlay file system. File system modifications, such as editing files or deleting directories, may occur in a compute and storage constrained environment, such as a web browser and persisted to a minimal upper layer. The upper layer may store less than the full data structure stored in the lower layer. The upper and lower layers may be merged on-demand in a less constrained environment capable of interfacing with the remote data store.

Figure 1:
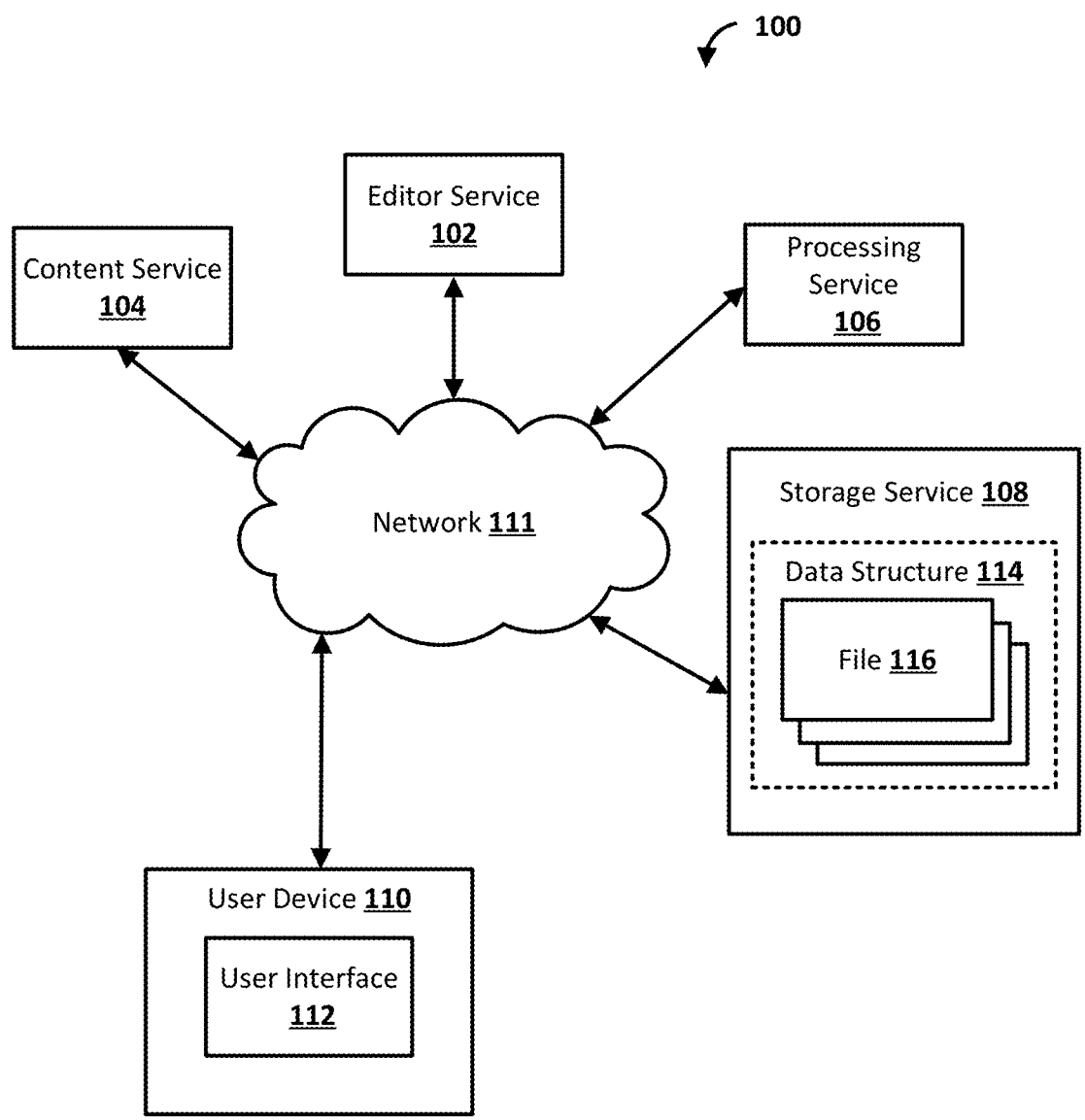
FIG. 1 is a diagram illustrating an example computing system for implementing an editor service.

FIG. 1 is a diagram illustrating an example computing system 100 for providing one or more services. The one or more services may comprise an editor service 102, a content service 104, a processing service 106, a storage service 108, or a combination thereof. The editor service 102, the content service 104, the processing service 106, the storage service 108, or a combination thereof may be part of a services platform, such as a web services platform. The services platform may provide network based services that are geographically dispersed (e.g., external to user premises). The services platform may provide the one or more services to one or more user devices 110.

The system 100 may comprise a network 111. The network 111 may be configured to communicatively couple one or more of the services platform, the editor service 102, the content service 104, the processing service 106, the storage service 108, the user device, and/or the like. The network 111 may comprise a plurality of network devices, such as routers, switches, access points, switches, hubs, repeaters, modems, gateways, and/or the like. The network 111 may comprise wireless links, wired links, a combination thereof, and/or the like.

The one or more user devices 110 may comprise a computing device, such as mobile device, a smart device (e.g., smart watch, smart glasses, smart phone), a computing station, a laptop, workstation, a tablet device, a premises device, an automation device, an internet of things device, a smart appliance, a security device, and/or the like. The one or more user devices 110 may be configured to output one or more user interfaces 112, such as a user interface associated with the content service 104, a user interface associated with the editor service 102, a user interface associated with the processing service, or a user interface associated with the storage service 108, and/or the like. The one or more user interfaces 112 may a comprise a file editor interface. A file editor interface may comprise a user interface that allows users to edit, copy, create, delete, move, rename, or a combination thereof of one or more files. The one or more files associated with a file system (e.g., whether virtual or real) that comprises one or more directories and one or more files. The file editor interface (e.g., or user interface more generally) may allow users to navigate the file system. The file editor interface (e.g., or user interface more generally) may allow users to edit, copy, create, delete, move, rename, and/or a combination thereof any directories in the file system.

The processing service 106 may be configured to provide processing services, such as on-demand processing, a network (e.g., or web) based processing service, and/or the like. The processing service 106 may comprise one or more computing nodes (e.g., servers, virtual machines, computing devices). The one or more computing nodes may be implemented by one or more computing devices, such as servers.

The one or more computing devices may each be configured to host a plurality of computing nodes. The one or more computing nodes may be used for processing requests associated with the services of the services platform, such as the editor service 102, the content service 104, and the storage service 108. The storage service 108 may be configured to provide storage, such as database storage, distributed storage, object storage, file storage, and/or the like. The storage service 108 may store data associated with one or more of the content service 104 or the editor service 102.

The content service 104 may be configured to provide a network-based content service. The content service 104 may be implemented by one or more of the computing nodes of the processing service 106. The content service 104 may provide access (e.g., via the network 111) to content. The content may be provided to the content service 104 from the one or more user devices 110. The content may comprise text, audio, video, computer-readable code, gaming content, application content, a combination thereof, and/or the like. The content service 104 may provide a user interface for uploading and/or configuring the content. The content may comprise one or more files for an application, such as a web-application, a network-based application, and/or the like. The content service 104 may be configured to host the application to allow users to access the application via the network 111. The content service 104 may be configured to provide a serverless compute platform. The serverless compute platform may allow users to upload computer-readable code and/or other content to provide an application without having to manage an application server, such as a web server.

The content uploaded for the content service 104 may be stored by the storage service 108. The content may be organized and/or stored as a set of files, such as project and/or package. A user may, via the content service 104, create different projects. Each project may have its own associated data structure 114 (e.g., a set of files, package, and/or file system). The data structure may be organized as a file system. The file system may comprise one or more directories and/or one or more files 116. Each data structure 114 may have a root directory in which files and directories are stored. The data structure 114 may comprise a hierarchical data structure, a tree data structure, and/or the like. The data structure 114 may comprise nodes representing directories and/or files. Each file node may be linked (e.g., or associated) with a corresponding parent directory node. Each directory node (except the root node) may be linked (e.g., or associated with) a corresponding parent directory node.

The content service 104 may allow users to launch the editor service 102 to edit the content associated with a user account. The editor service 102 may be configured to provide user interface data to the user interface 112 (e.g., to the file editor interface) of the user device 110 to implement the user facing portion of the editor service 102. The editor service 102 may comprise a video editor, an audio editor, a text editor, a document editor, an application editor, and/or the like. The editor service 102 may comprise a code editor, such an integrated development environment. The code editor may allow users to edit, debug, format, execute, and/or the like computer readable code. The code editor may support different formatting conventions for a variety of programming languages. The code editor may allow users to navigate directories comprising all the files of a particular application (e.g., or service, web application).

The editor service 102 may be configured to provided editing functionality based on capabilities of the user interface 112 (e.g., the file editor interface) and/or user device 110. The user interface 112, application (e.g., content browser) executing the user interface, and/or the user device 110 may have a limitation, such as resource limitation, a storage size limitation, a processing limitation, and/or the like. The user interface 112 may be a web browser that has a local storage limitation (e.g., max storage in a range of one or more of about 2 mb to about 10 mb, about 1 mb to about 15 mb, about 1 mb to about 20 mb). The limitation may vary from one user interface 112 to another. The limitation may vary from one user device 110 to another. The editor service 102 may be configured to dynamically provide a user interface 112 that satisfies the limitation for a particular user device 110.

The editor service 102 may be configured to emulate access (e.g., full access) to a file and/or set of files (e.g., or data structure) for the user interface 112 while the user interface 112 (e.g., the file editor interface) only accesses a limited portion of the file or set of files (e.g., or data structure). While the user interface may represent all of a file or a set of files as accessible (e.g., visible, editable) to a user, only the limited portion of the file or set of files may actually be locally stored by the user interface 112. The editor service 102 may stream portions of a file to the user interface as the user navigates the file. The file may be fragmented into file fragments that are within the limitation of the user interface 112. The editor service 102 may also send individual files instead of the full set of files (e.g., or data structure, directory) shown to a user. The user interface 112 may show all of a set of files of a project as a directory or other representation. The editor service 102 may configure the user interface 112 to allow the user to navigate the full set of files via the directory without storing all of the full set of files in local storage. Files or portions of files that are viewed but not edited may be stored in memory (e.g., stored in non-persistent storage and not stored in persistent storage). The editor service 102 may configure the user interface 112 to only store edited files or edited portions of files in local storage (e.g., persistent storage, browser storage, disk storage).

The editor service 102 may be configured to receive, from the user interface 112 (e.g., the file editor interface), data indicating the edited files (e.g., or edited portions of files). The editor service 102 may configure the user interface 112 to generate a data structure indicative of one or more modifications to the files (e.g., or modifications to a portion of a file, a directory, or a file system). The data structure indicative of the one or more modifications may comprise a version of the file system stored in local storage associated with the user interface (e.g., local storage of the application, content browser). The data structure indicative of the one or more modifications may be limited to storing portions of the file system modified by the one or more modifications. If a file is edited, the modified version of the file may be added to the data structure. If a file is viewed but not edited, the file may not be added to the data structure. The data structure indicative of the modifications may comprise a hierarchical data structure, a tree structure, and/or the like. The modified version of the file may be added to the data structure as a node. The node may be added as a descendent or otherwise associated with another node. Directory nodes may have file nodes and/or directory nodes as descendants in the data structure. Any directory, file, or portion of a file that is renamed, moved, modified, edited, deleted, copied, and/or the like may have a corresponding node added to the data structure to represent the change.

The editor service 102 may be configured to receive the data structure indicative of the modifications from the user interface 112. The editor service 102 may be configured to update the original data structure 114. The editor service 102 may be configured to read the data structure indicative of the modifications and cause the same changes to be performed on the original data structure. If the data structure indicative of the modifications comprises a single updated file, the editor service 102 may cause the original file 116 on the storage service 108 to be updated to match the updated file (e.g., or replaced by). Individual file segments may be replaced to cause the update. Directories and/or files may be renamed, copied, and/or moved within the data structure to cause the update. The editor service 102 may cause a computing node (e.g., or computing device, server) that does not have the limitation of the user interface 112 and/or user device 110 to perform the update.

The original data structure 114 may need to be processed to make the updates. The processing to make the updates may exceed the limitation of the user interface 112 and/or user device 110. The processing may occur external to the user device (e.g., by a server and/or computing node managed by the editor service 102). The entire data structure 114 for a project (e.g., or set of files) may need to be processed to make the updates. A part of the data structure 114 greater than the updated portion may need to be processed to make the updates. The data structure 114 (e.g., or portion thereof) may need to be uncompressed, unzipped, unpackaged, decoded, and/or the like to reveal the underlying data structure. The modifications may be applied to create an updated data structure. The updated data structure may be compressed, zipped, packaged, encoded, encrypted, and/or the like. The resulting updated processed data structure may be stored in the storage service 108.

Figure 2:
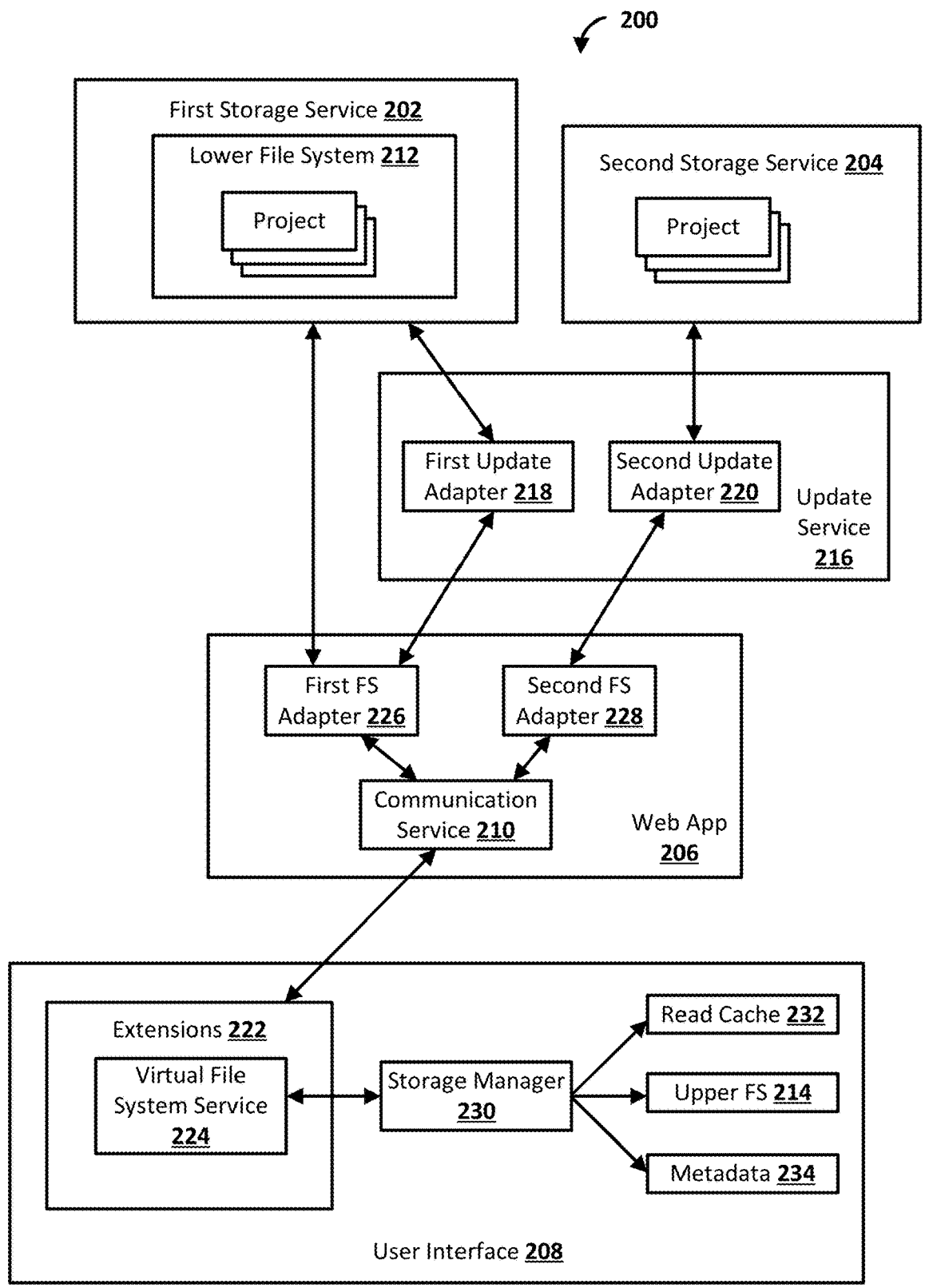
FIG. 2 is a block diagram showing another system for implementing an editor service.

FIG. 2 is a block diagram showing another example system for implementing an editor service. The editor service may comprise a service for editing files (e.g., images, audio, video, documents, functions, computer readable code) in a constrained environment.

Figure 6:
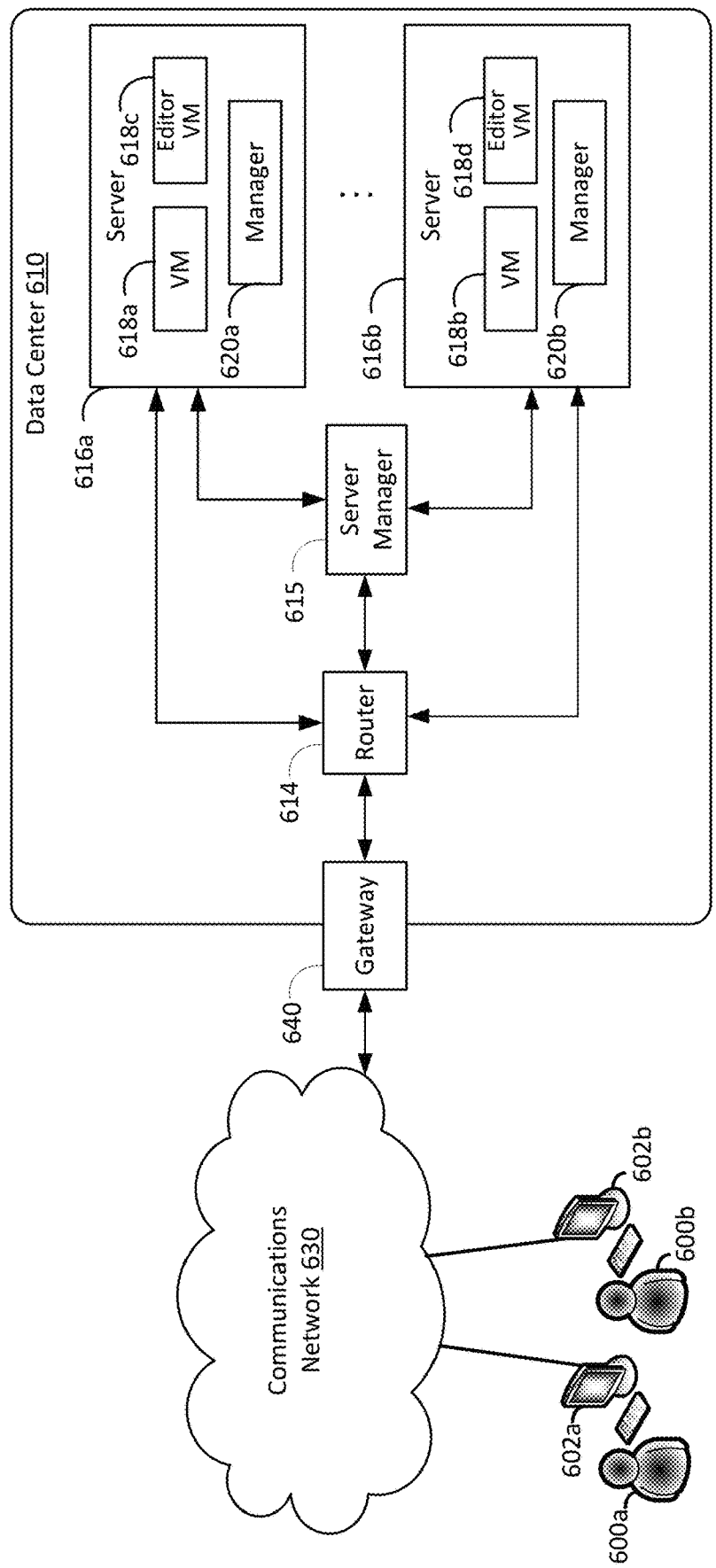
FIG. 6 is a diagram illustrating an example computing system that may be used in some embodiments.

The system 200 may comprise a first storage service 202. The system 200 may comprise a second storage service 204. One or more of the first storage service 202 or the second storage service 204 may be configured to store one or more projects for one or more users. An example project can comprise data associated with a user account. The data may comprise a single file, a portion of a file (e.g., code snippet), one or more files organized in one or more directories, and/or the like. The data may be stored as a package, such as zip package or other package (e.g., git package). The first storage service 202 may be a service that is part of a platform for hosting computing resources. The second storage service 204 may be a cloud based (e.g., or network based) storage service, a file repository (e.g., code repository), or any service external to the platform for hosting computing resources. The platform may be configured to process (e.g., host execute), using the computing resources, the files stored on the second storage service 204. The term "cloud based" refers to a resource (e.g., computing device, processing, virtual machine, storage device, application) provided as a service via a network. A cloud-based resource may typically (e.g., but not always) be accessed via a wide area network from a geographic location remote from the location of the user. Cloud based resources may be located in one or more data centers. The one or more data centers may be geographically dispersed. The data centers may be located at premises that are external to user premises where users typically access the service. FIG. 6 provides a detailed example of an implementation of a cloud-based resource.

The system 200 may comprise a web application 206. The web application 206 may be configured to provide a variety of services associated with the platform. The web application 206 may provide a serverless code service. The serverless code service may allow users to configure serverless code to be stored and/or executed by the platform. The serverless code may be stored as projects in the first storage service 202 and/or the second storage service 204. The web application 206 may have an interface element that launches a user interface 208 (e.g., in a content browser, in a new window, in a tab, in an interface element) for editing the projects. The web application 206 may have a communication service 210 configured to communicate with the user interface 208. The communication service 210 may be configured to send data associated with a project to the user interface 208. The communication service 210 may be configured to receive, from the user interface 208, data indicative of modifications to files and/or directories, associated with a project. The data indicative of the modifications may comprise a data structure indicative one or more modifications to a file system, a file, a directory, or a combination thereof. The data structure indicative of the one or more modifications may comprise a version (e.g., or representation) of the file system stored in local storage of the content browser. The data structure indicative of the one or more modifications may be limited to storing portions of the file system modified by the one or more modifications. The user interface 208 may comprise a file editor interface, such as a user interface that allows users to navigate, edit, copy, create, delete, move, rename, or a combination thereof of one or more files, directories, files systems, or a combination thereof.

The system 200 may be configured to implement a virtual file system. The virtual file system may be configured to accommodate a limitation of the user interface 208 (e.g., the file editor interface), such as a resource limitation, a storage size limitation, a processing limitation, a bandwidth limitation, and/or the like. The system 200 may implement the virtual file system based on multiple layers (e.g., or levels). The virtual file system may be implemented using a lower file system 212 (e.g., or a lower level) and an upper file system 214 (e.g., or upper level). The lower file system 212 may be stored in the first storage service 202 and/or the second storage service 204). The lower file system 212 may be a read only file system to the user interface 208. The user interface 208 may not be configured to directly edit files and/or directories stored in the lower file system 215. Instead the user interface 208 may be configured to store only edits to files and/or directories in the upper file system 214. The upper file system 214 may store updated versions of directories, files, and/or a file system (e.g., files, directories, relationships between the two)

The virtual file system may be implemented using a data structure, such as a hierarchical data structure, tree data structure, a trie data structure, and/or the like. Files and/or directories may be stored in one or more of the lower file system 212 or the upper file system 214 as entries of the data structure (e.g., as nodes in a tree data structure). The update service 216 may be configured to compare a data structure stored in the lower file system 212 to a corresponding data structure received from the upper file system 214. Nodes in a tree structure from the upper file system 214 can be compared to nodes in the lower file system 212. The update service 216 may be configured to process the data structure in the lower file system 212 based on the data structure of the upper file system 214. The presence of a node (e.g., or data entry) in the upper file system 214 may indicate that a user performed an operation on the node (e.g., resulting in a change, modification). For example, if user edited a file, the presence of file as a node in the data structure may indicate that the file is different than the corresponding file in the lower file system 212.

The presence of a node (e.g., or entry) in the data structure can trigger the update service 216 to update (e.g., modify, replace) the original file (e.g., or original node, entry) in the lower file system based on the updated file from the upper file system 214 (e.g., or node in the data structure from the upper file system 214). The update service 216 may be configured to read each node in the data structure and apply the corresponding operation to the data structure of the lower file system 212. The data structure may indicate ordering of operations performed by the user. The ordering may be indicated by numerical identifiers associated with (e.g., or stored in) each node (e.g., or entry) in the data structure of the upper file system 214. Lower numerical identifiers may indicate earlier operations and higher numerical identifiers. The update service 216 can use different update adapters, such as a first update adapter 218 and a second update adapter 220, for different storage services. The first update adapter 218 may be configured to manage updates for a first storage format (e.g., projects stored in zip files). The second update adapter 220 may be configured to manage updates for a second storage format (e.g., git packages). Any number of adapters may be used for updating, merging, replacing, and/or the like files, directories and/or the like stored in different storage services.

The user interface 208 may comprise one or more extensions 222 configured to send messages to the communication service 210. The one or more extensions 222 may comprise a virtual file system (VFS) service 224. The VFS service 224 may be configured to implement (e.g., or support) a virtual file system that satisfies the constraints and/or limitations of the user interface 208. The user interface 208 may have local storage that is limited in size. The project and/or files that a user has requested to edit may exceed (e.g., in size, or processing power) the limitation. The VFS service 224 may support different storage services, such as the first storage service 202 and the second storage service 204.

The user interface 208 may request access to a project stored on the first storage service 202. The user interface 208 may send a message to the communication service 210 requesting access to the project. The web application 206 may have one or more file system adapters, such as a first file system (FS) adapter 226 associated with the first storage service 202 and a second file system (FS) adapter 228 associated with the second storage service 204. The communication service 210 may cause the first FS adapter 226 to communicate with the first storage service 202. The first FS adapter 226 may request data indicating the contents of the project. The data indicating the contents may be sent to the VFS service 224, which may cause the contents to be displayed to the user. The user may select one of the files shown in the contents. The VFS service 224 may send a request for the requested file to the communication service 210. The communication service 210 may cause the first FS adapter 226 to retrieve the requested file (e.g., or portion of the file). The first FS adapter 226 may be configured to stream portions of the project. The first FS adapter 226 may stream the requested file by requesting the file, requesting portions of the file, requesting the entire project and sending only the requested file or portion of the file to the user interface 208, or any other suitable mechanism.

The first file system adapter 226 and/or the second file system adapter 228 may be configured to process requests from the user interface 208 (e.g., provided via the communication service 210). A request may be processed to generate a request specific to the corresponding file storage service, such as the first storage service 202 or the second service 204. The request may be processed by identifying a portion of the requested directory and/or file. The request may indicate that a user has only requested to view one particular file, directory, part of a file, part of a file system, and/or the like of a project. If the corresponding storage service only supports requests for an entire project, directory, filesystem, or file, then the first file system adapter 226 and/or second file system adapter 228 may be configured to request the project, directory, filesystem, or file. The first file system adapter 226 and/or second file system adapter 228 may be configured to process (e.g., unpackage, decompress, decrypt, segment) the data received based on the request to access the determined portion. The determined portion can be provided to the user interface 208 (e.g., which may emulate or represent the entire file project, file, directory, and/or like despite only storing a portion thereof). If the corresponding storage service supports a request for the determined portion, then the first file system adapter 226 and/or second file system adapter 228 may be configured to send a request for the determined portion.

The file system adapters (e.g., first file system adapter 226, the second file system adapter 228), the user interface 208, or a combination thereof may be configured to determine whether a request from a user does not satisfy (e.g., exceeds) a constraint and/or limitation of the user interface 208. If the constraint and/or limitation is not satisfied. The file system adapters (e.g., any other process of a server), the user interface 208, or a combination thereof may be configured to modify the request, deny the request, and/or generate a new request. The new request and/or modified request may specify a portion of the requested project, directory, file system, file, and/or the like. The portion may be a portion that satisfies the constraint and/or limitation.

As a non-limiting example, a first user and a second user may access the user interface 208. The first user may access the user interface 208 via a first content browser with a first storage limitation (e.g., 10 MB). The second user may access the user interface 208 via a second content browser with a second storage limitation (e.g., 5 MB). The first user may request access to a project that has a project size (e.g., 7 MB). A determination may be made that the project size satisfies the first storage limitation of the first content browser. The request may be processed without modification. The user may add additional files and/or directories to the project. These additional files may be stored locally in browser storage (e.g., adding more data to the 7 MB). The user interface 208 may track how much storage the first user is currently using. If the storage is within a threshold of the storage limitation, the user interface 208 may delete files, directories, or portions thereof from local storage that the user has not accessed (e.g., opened, viewed) and/or is predicted not to access. The new files, edits, and/or the like may remain in the local storage. In some scenarios, edits (e.g., or additions) of files, directories, projects, and/or the like may periodically (e.g., upon a trigger, such as reaching a threshold or periodic time interval) be transmitted to the web app 206 to create space for additional edits (e.g. or additions).

The second user may request the project (e.g., which may be 7 MB or be updated by the first user to be larger than 7 MB). It may be determined that the request does not satisfy the second storage limitation of the second content browser. The request by the second user may be modified and/or a new request may be generated. It may be determined (e.g., based on user history, or data in the request) that the second user only needs access (e.g., or is predicted to need access) to a specific file, directory, or portion thereof of the project. For example, user history may indicate the last file (e.g., or directory, portion of file) edited by the second user, the most recent file updated by any user (e.g., the first user), and/or other information. The last file (e.g., or directory, portion of file) edited by the second user (e.g., or the more recent file updated by the first user) may be requested (e.g., instead of the entire project, file, or directory). The second content browser may receive the portion of the project and display via the user interface 208 the portion of the project. The user interface 208 may emulate or otherwise represent that the user interface is accessing the entire project (e.g., or file, directory, etc). The second user may be shown a file system representing the entire project, while the user interface is only storing locally in storage of the content browser the portion of the project.

The VFS service 224 may receive the requested file. The VFS service 224 may cause a storage manager 230 to store the requested file. The storage manager 230 may be configured to manage different types of storage, such as read cache 232, upper file system 214, and metadata 234. The upper file system 214 and/or the metadata 234 may be stored in local storage (e.g., browser storage) that persists after a session is ended (e.g., closing the web browser, navigating to a different application, timeout). The storage manager 230 may store the requested file in the read cache 232. The read cache 232 may be storage that does not persist after a session. A session may end when a user closes the user interface, navigates to a different user interface, and/or the like. The read cache 232 may comprise in-memory storage. The local storage may comprise disk storage.

The user interface 208 may display the file for editing. If the user performs an action that causes a file and/or directory to be modified, then the VFS service 224 may cause data indicating the modification to be stored on one or more of the read cache 232 or the upper file system 214. The upper file system 214 may store the data indicating the modification in a data structure, such as a tree structure (e.g., trie data structure), a linked list, a nested structure (e.g., nested tag structure), extensible markup language (XML) structure), and/or the like. Upon a triggering action (e.g., a save, a timer, and/or the like), the data structure in the upper file system 214 may be sent to the update service 216 (e.g., via the web app 206, or directly sent). The update service 216 may process the data structure from the upper file system 214 to make corresponding updates in the file and/or directories in the lower file system 212.

FIGS. 3A-L are diagrams showing a variety of example editing operations and corresponding updates to a file system (e.g., or data structure) for a constrained environment. The constrained environment may comprise a content browser or other application. The constraint or limitation of the environment may be due to variable circumstances (e.g., battery life, disk usage, processing power, application priority constraints, operational mode), may be due to preprogrammed constraints (e.g., the browser may be programmed with a maximum local storage accessible by user interfaces or scripting thereof), or a combination thereof. The constrained environment may output a user interface, such as a file editor interface or other interface as described herein. In some scenarios, the constrained environment may be the user interface. The content browser may impose different limitations for different user interfaces.

These following examples are for purposes of illustration only and should not be considered as limiting the disclosure. Directories are shown as rounded boxes. Files are shown as circles. A solid arrow indicates that a file is in a directory. A dashed arrow indicates that an item is copied from a location. A shaded item with dotted shading indicates that the node is an opaque node. A shaded item with shading without dots indicates that the node is a whiteout node. An opaque node indicates that the lower file system must not read the node from the lower file system (e.g., and use the node from the upper file system instead). A whiteout node indicates that the node has been deleted in the upper file system and must not be read from the lower file system.

Each diagram is divided into four sections representing an example file system (e.g., of a package, project, environment). On the upper left, the example file system file system is shown as stored by a lower file system layer. On the middle left, representation of the example file system is shown as stored in a read cache. On the bottom left, a representation of the example file system is shown as stored in an upper file system layer. On the right, a representation of a visible structure of the example file system is shown (e.g., as displayed on the user interface).

Figure 3A:
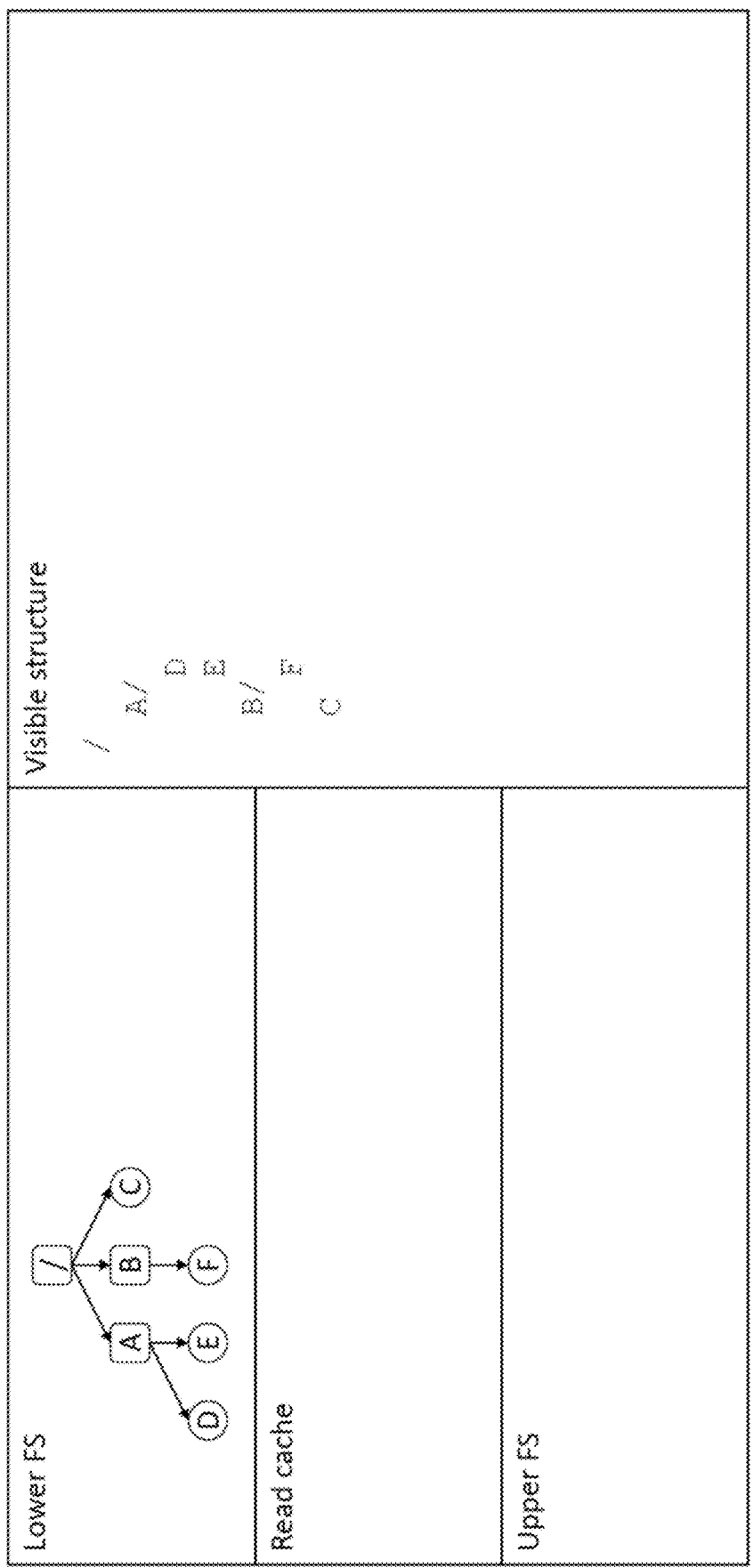
FIG. 3A is a diagram showing an initial state of an example file system for a constrained environment.

FIG. 3A is a diagram showing an initial state of a file system for a constrained environment. The file system includes a root directory ("/") that includes directory A, directory B, and file C. Directory A includes files D and E. Directory B includes file F. The user interface may have not yet requested the file system. The lower file system may be stored as a data structure on a storage service external to a computing device comprising the user interface. The data structure may comprise a tree structure. The tree structure may comprise one or more directory nodes (e.g., or folder nodes). The tree structure may comprise one or more file nodes. The tree structure may store relationships between the directory nodes and the file nodes.

Figure 3B:
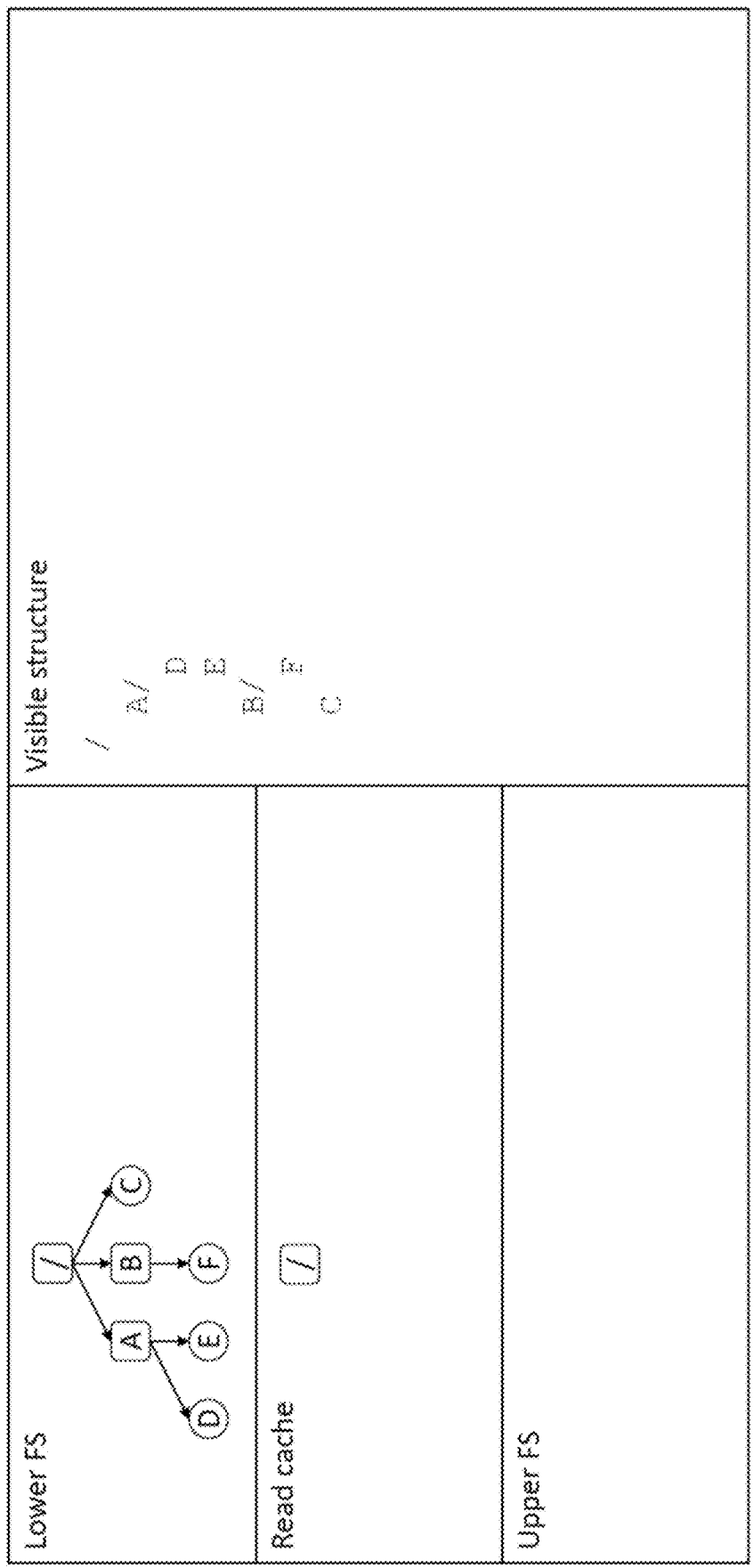
FIG. 3B is a diagram showing a state of the example file system after a read operation.

FIG. 3B is a diagram showing a state of the example file system after a read operation. The user interface may receive data indicating a command to read the root directory of a file system (e.g., package, project). The user interface may display the directories and files of the file system to a user. The root directory may be copied from the lower file system to a read cache of the user interface. The contents of the root directly may not be copied to the read cache, but only entry representing the root directory may be copied. The read cache may comprise a data structure indicative of one or more files, directories, and/or a file system accessed by the user interface. The data structure may comprise a tree structure. The read cache my store the root directory as a root node of the tree structure. The tree structure may be only a portion of the tree structure stored in the lower file system.

Figure 3C:
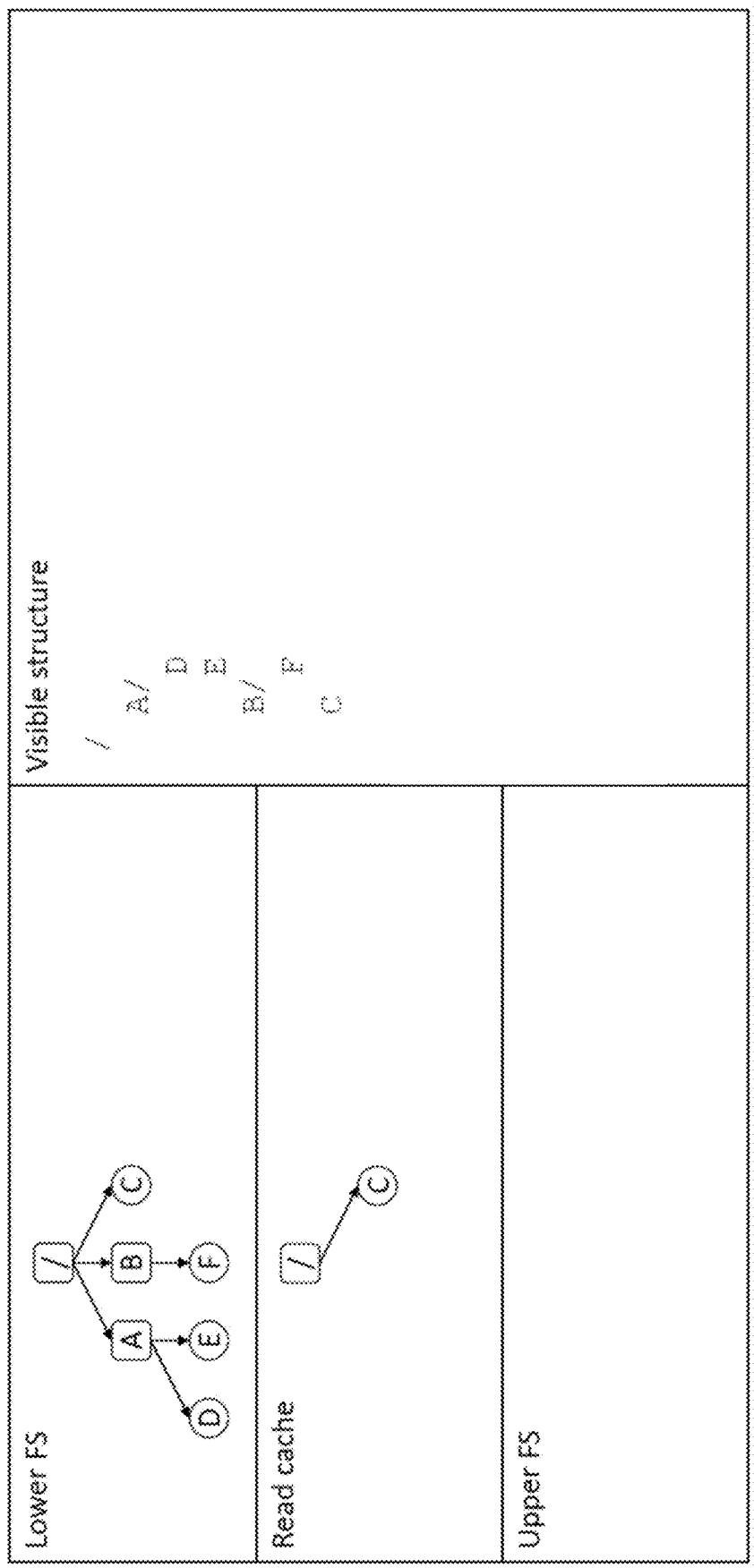
FIG. 3C is a diagram showing a state of the example file system after a file is opened.

FIG. 3C is a diagram showing a state of the example file system after a file is opened. The user interface may receive data indicating a command to open the file C (e.g., by selecting the visual element representing the file). The user interface may copy the file C from the lower file system to the read cache. If the file C is too large for the storage size limitation of the user interface, the file system may be configured to logically segment the file into smaller portions. The initial segment may be stored in the read cache. The tree structure in the read cache may be updated to include a file node representing the file C.

Figure 3D:
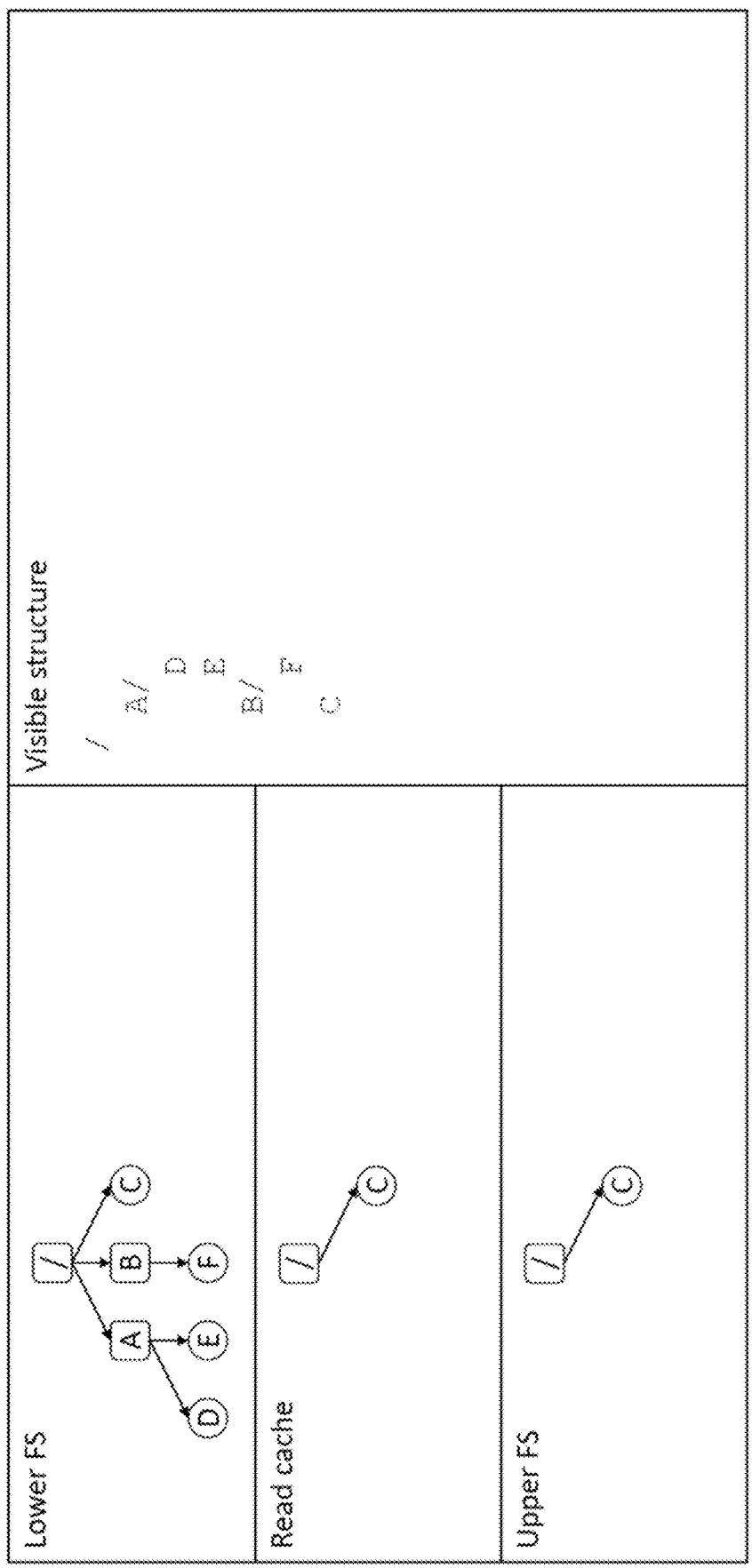
FIG. 3D is a diagram showing a state of the example file system after the file is edited.

FIG. 3D is a diagram showing a state of the example file system after the file is edited. The user interface may receive data indicating a command to edit the file C. For example, the user may change text written (e.g., such as computer readable code) in the file. If the file is an image, video, or audio, the user may apply a filter, adding a section, or delete a section of the file. The upper file system can be updated to include the edited file. The read cache may also include the edited file. The tree structure in the read cache may be updated by editing the file node for the file C. The upper file system may store a copy (e.g., may shadow) of the edited file (e.g., or a copy of the tree structure).

The upper file system may comprise a data structure indicative of one or more modifications to a file system, file, directory, and/or the like. The upper file system may comprise a version (e.g., or representation) of the file system stored in local storage of the content browser and limited to storing portions of the file system modified by the one or more modifications. The data structure may comprise a tree structure (e.g., tree data structure), such as a trie data structure. The upper file system can be updated by adding, to the upper file system, one or more nodes node in a tree structure. The tree structure may comprise a root node representing the root directory, a node representing the edited file, a relationship between the root node and the edited file node, or a combination thereof.

Figure 3E:
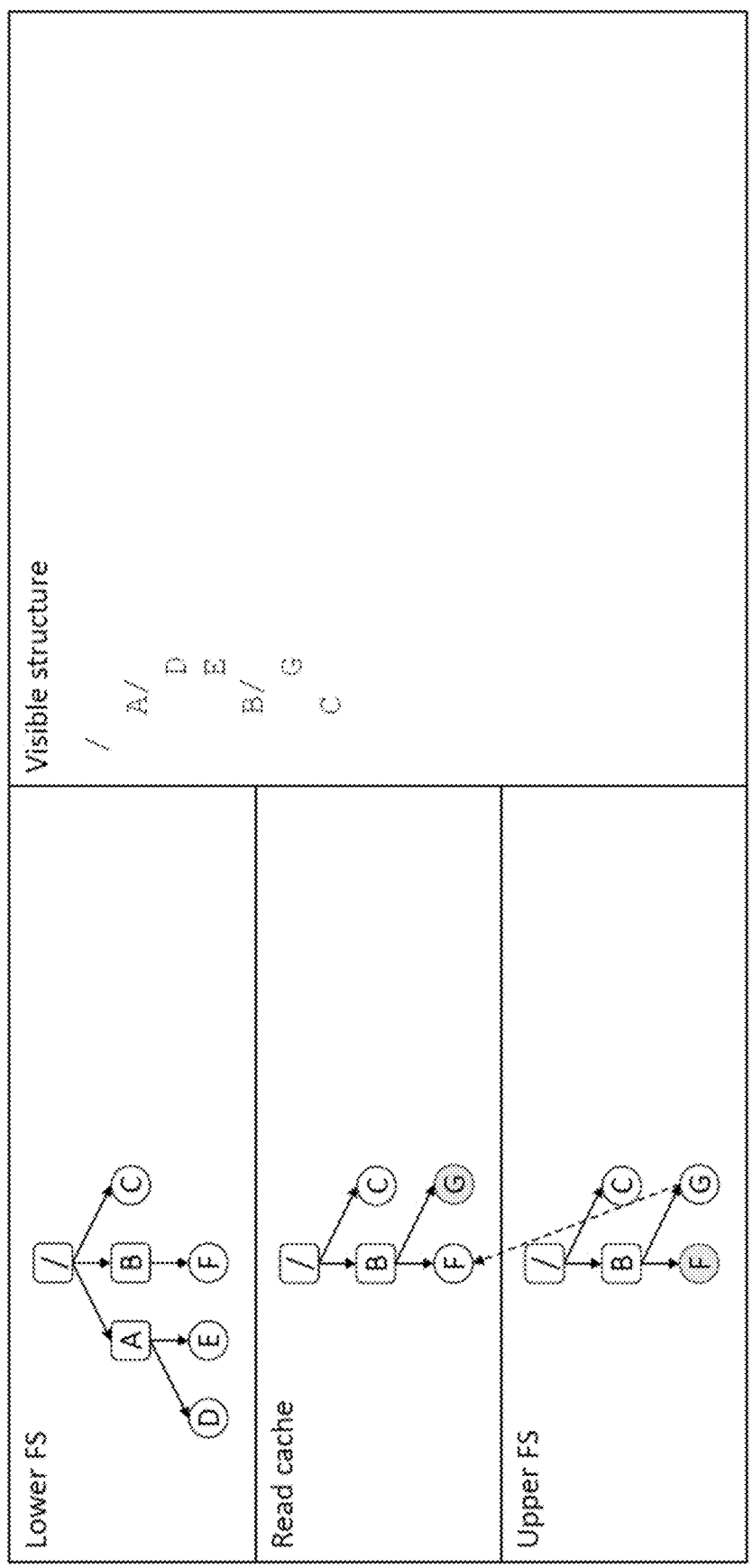
FIG. 3E is a diagram showing a state of the example file system after a file is renamed.

FIG. 3E is a diagram showing a state of the example file system after a file is renamed. The user interface may receive data indicating a command to rename the F file to a G file. The read cache may be updated to include the G file. The original F file may remain in the read cache. The tree structure of the read cache may be updated to add the G file node (e.g., while the F file node remains). The G file node may be identified as a node that does not exist in the lower file system (e.g., a whiteout node).

The upper file system may be updated to indicate the change in the file name. The tree structure in the upper file system may be updated to add a G file node (e.g., by making a copy of the F node in the read cache). The F file node in the tree structure of the upper file system may remain in the tree structure. The F file node may be identified as a deleted node.

Figure 3F:
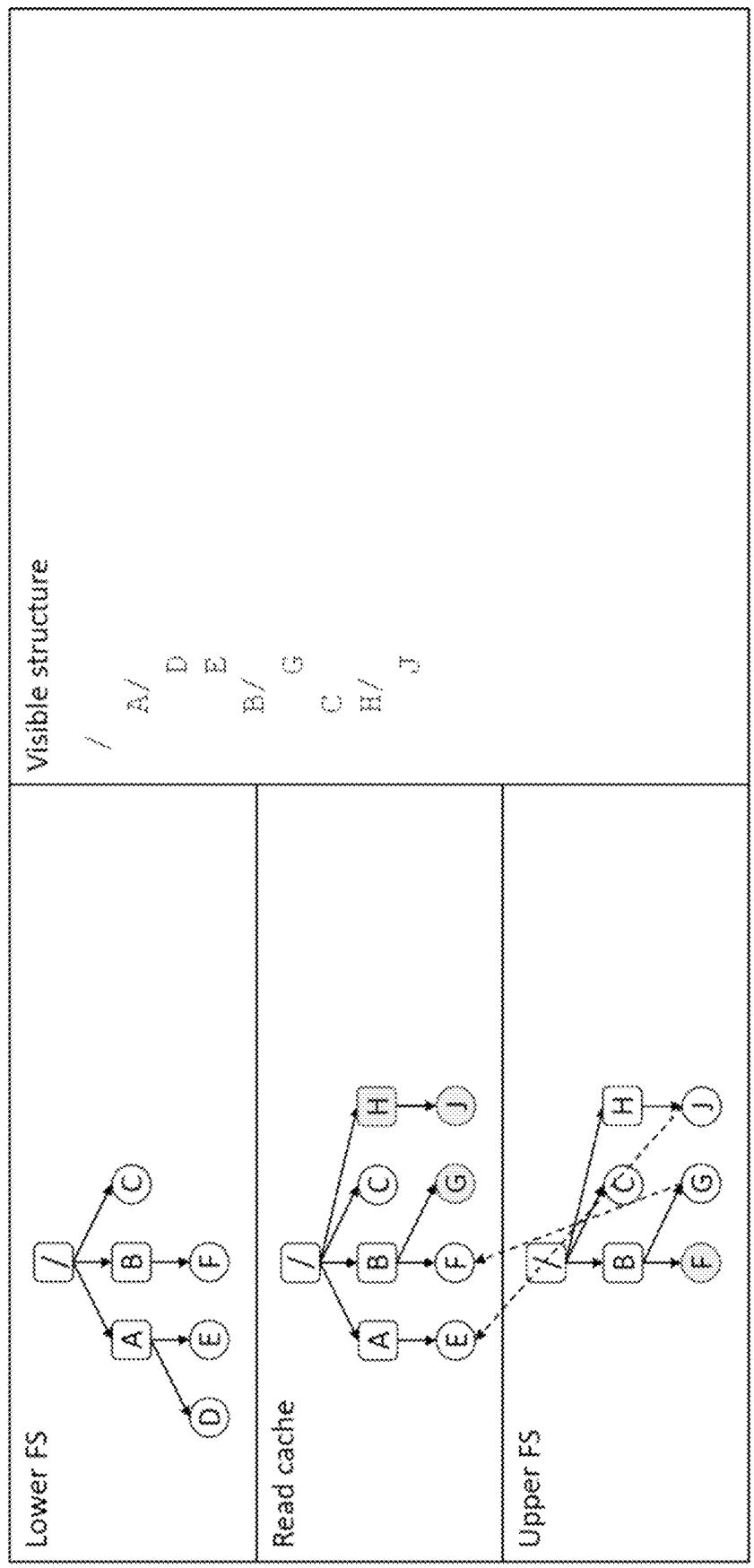
FIG. 3F is a diagram showing a state of the example file system after a file is copied.

FIG. 3F is a diagram showing a state of the example file system after a file is copied. The user interface may receive data indicating a command to copy the E file in the A directory as a new J file in a new H directory. The read cache may be updated to include the A directory and the E file (e.g., from the lower file system). The tree structure of the read cache may be updated to include the A directory node and the E file node from the lower file system. The read cache may be updated to include the H directory. The read cache may be updated to include the J file as included in the H directory. The tree structure of the read cache may be updated to add the H directory node and the J file node. The H directory node and the J file node may be identified as nodes that do not exist in the lower file system (e.g., a whiteout nodes).

The upper file system may be updated to indicate the addition of the H directory and the J file as a member of the H directory. The J file node may be a copy of the E file node from the read cache. The A directory node and the E file node may not be copied to the upper file system (e.g., because they have not been edited).

Figure 3G:
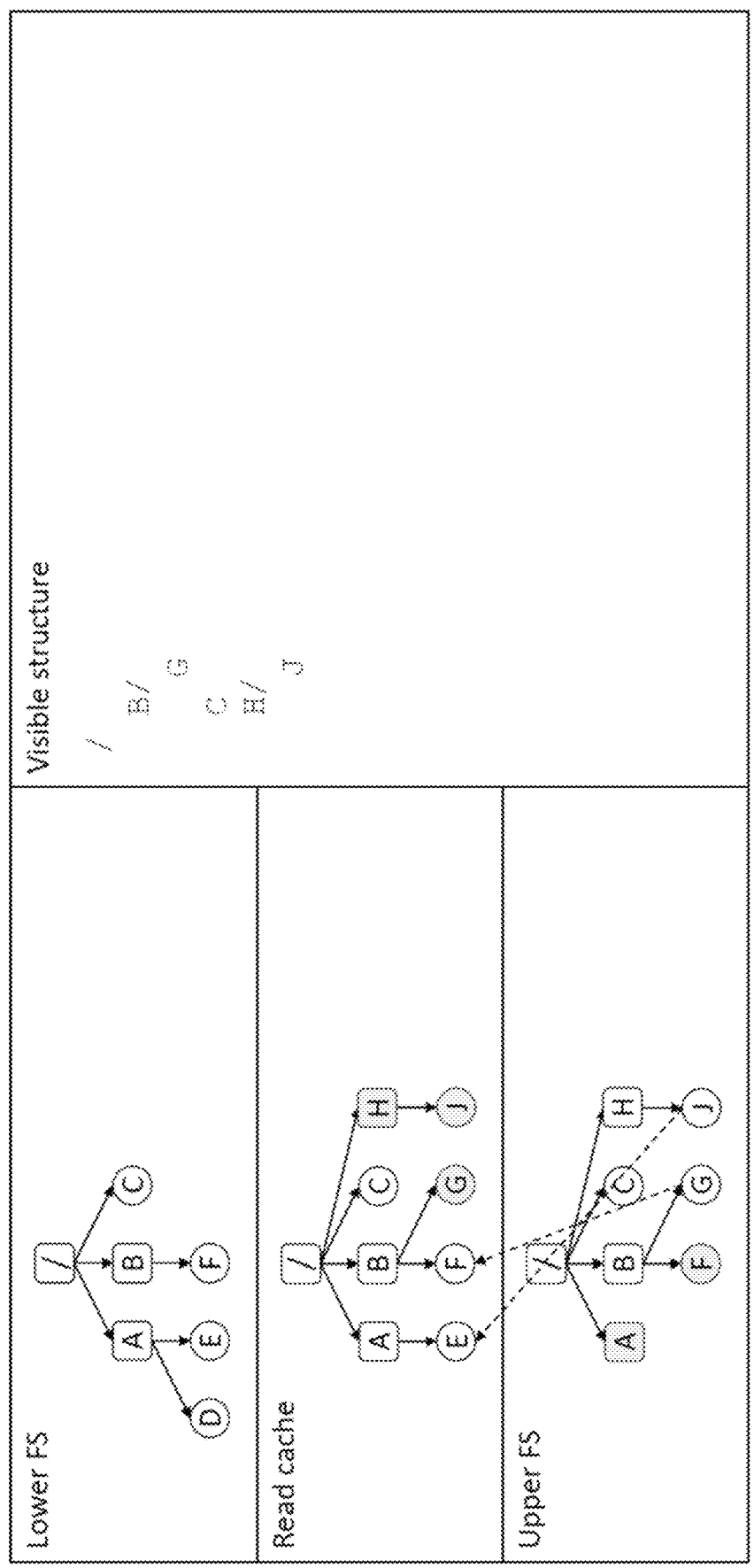
FIG. 3G is a diagram showing a state of the example file system after a directory is deleted.

FIG. 3G is a diagram showing a state of the example file system after a directory is deleted. The user interface may receive data indicating a command to delete the A directory. The A directory may remain in the read cache after the delete action. The A directory node may remain in the tree structure of the read cache. The visible structure shown on the user interface may no longer show the A directory or its contents. The upper file system may be updated to indicate that the A directory is deleted. A copy of the A directory node may be added to the tree structure of the upper file system. The A directory node may be identified as being deleted (e.g., indicated as a whiteout node). If the E node is read, its parent node will be taken into account, resulting in an error (e.g., error no entity, or ENOENT).

Figure 3H:
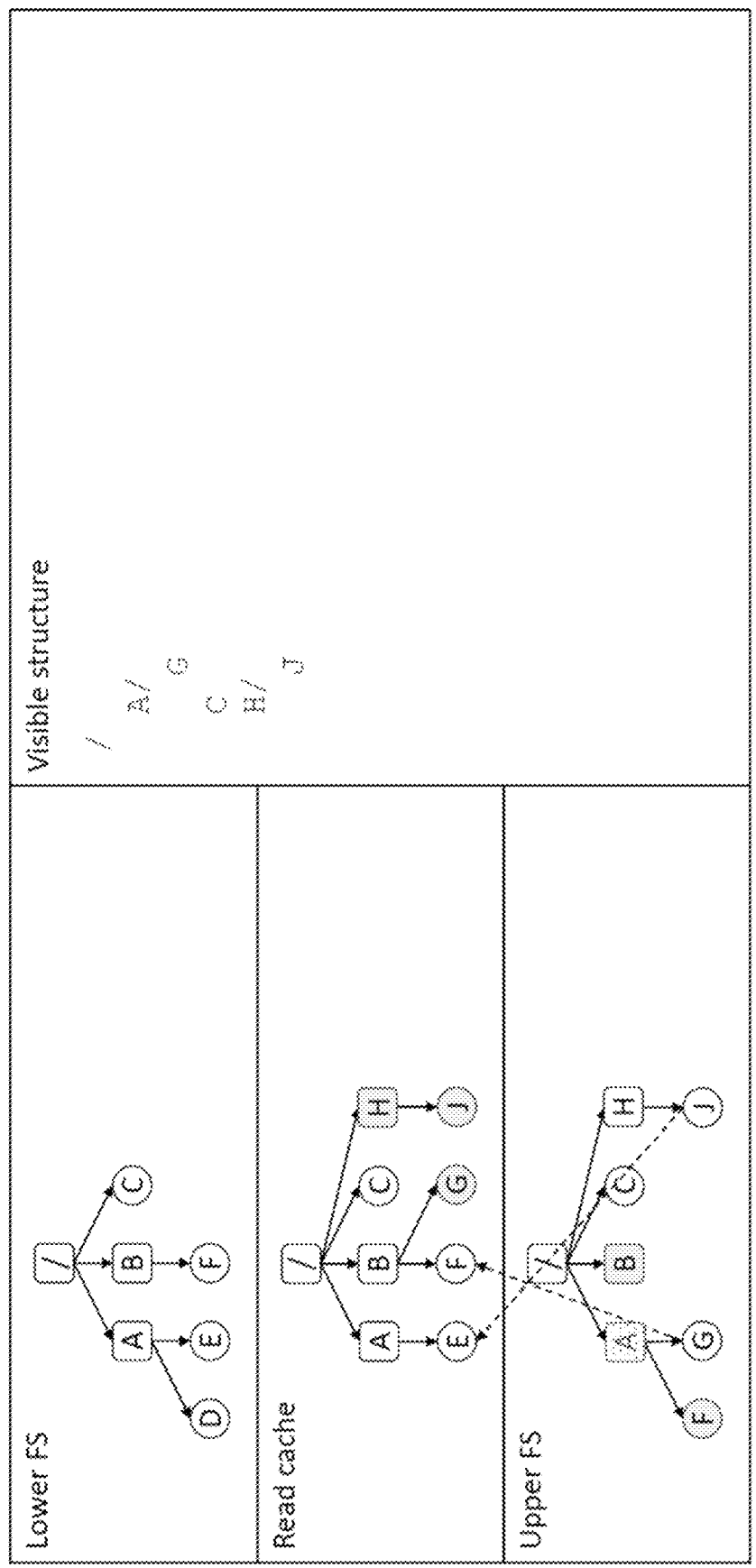
FIG. 3H is a diagram showing a state of the example file system after a directory is renamed.

FIG. 3H is a diagram showing a state of the example file system after a directory is renamed. The user interface may receive data indicating a command to rename the B directory to an A directory. The read cache may remain the same. The upper file system may be updated to show that the B directory is renamed to the A directory. The tree structure of the upper file system may be updated to no longer identifier the A node as deleted (e.g., as a whiteout node). The A node may be identified as a node that is given priority over a corresponding node in the lower file system (e.g., indicated as an opaque node, the A node should not be read in the lower filesystem but instead the one from the upper file system must be used). The F node and the G node of the read cache may be added as file nodes associated with the A directory node. The F node may be indicated as a deleted node. The G node may be added to the upper file system by copying the F node from the read cache.

Figure 3I:
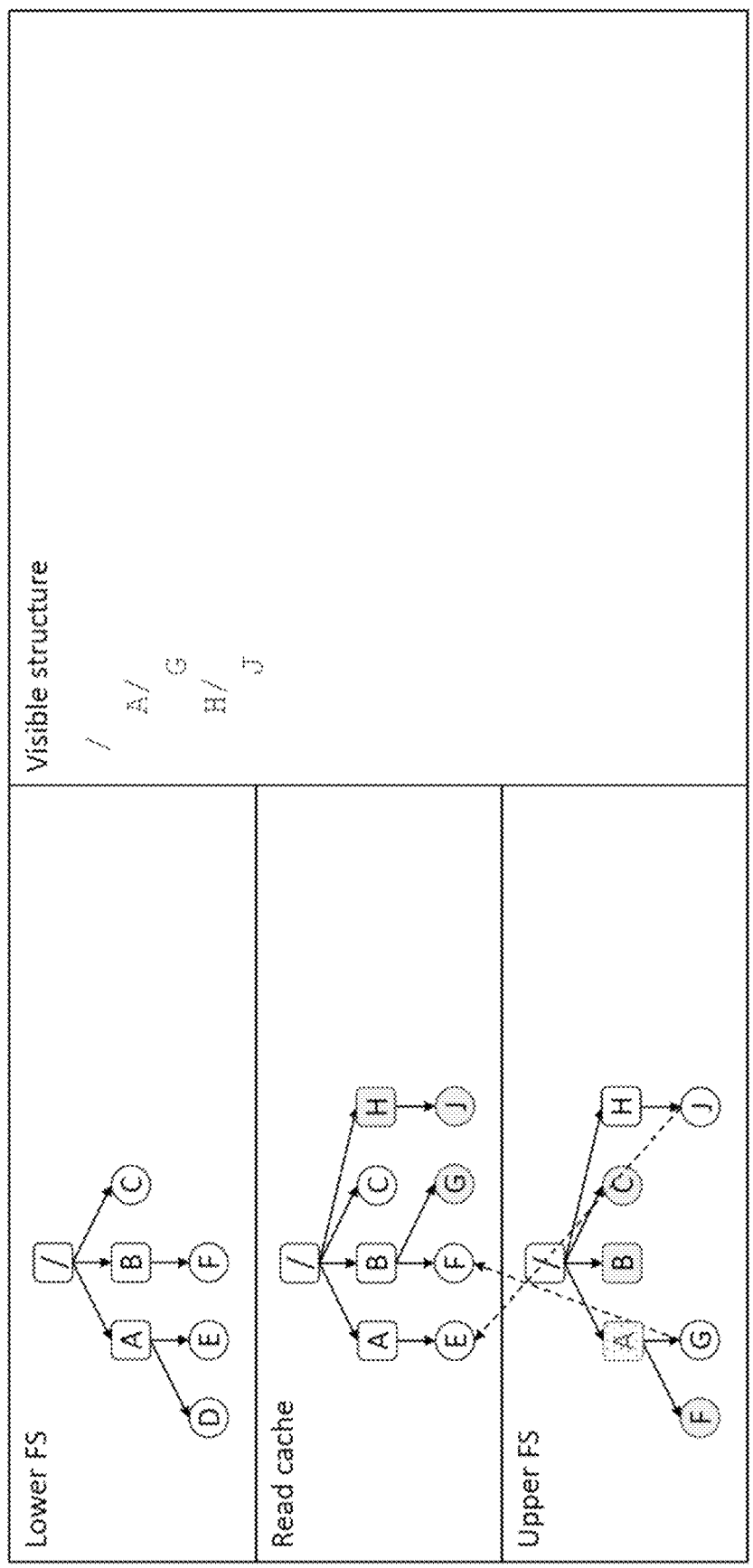
FIG. 3I is a diagram showing a state of the example file system after a file is deleted.

FIG. 3I is a diagram showing a state of the example file system after a file is deleted. The user interface may receive data indicating a command to delete the C file. The C file may remain in the read cache. The upper file system may be updated to indicate that the C file is deleted. The C file node in the tree structure of the upper file system may be updated to identify the C file node as deleted (e.g., whiteout).

Figure 3J:
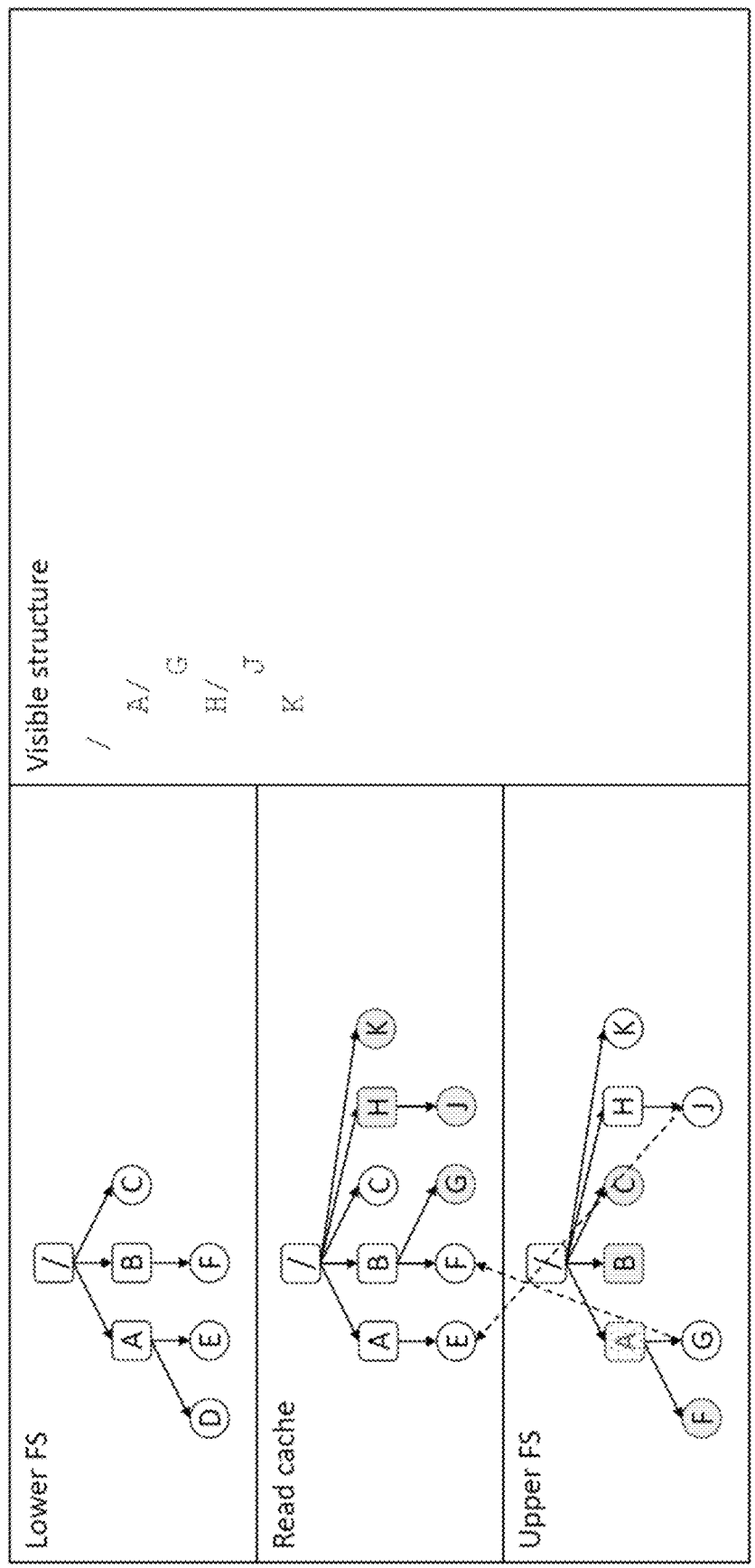
FIG. 3J is a diagram showing a state of the example file system after a file is created.

FIG. 3J is a diagram showing a state of the example file system after a file is created. The user interface may receive data indicating a command to create a new K file. The read cache may be updated to store the K file. The tree structure of the upper file system may be updated to add a K file node. The K file node may be identified as associated with (e.g., a descendent of) the root directory node.

Figure 3K:
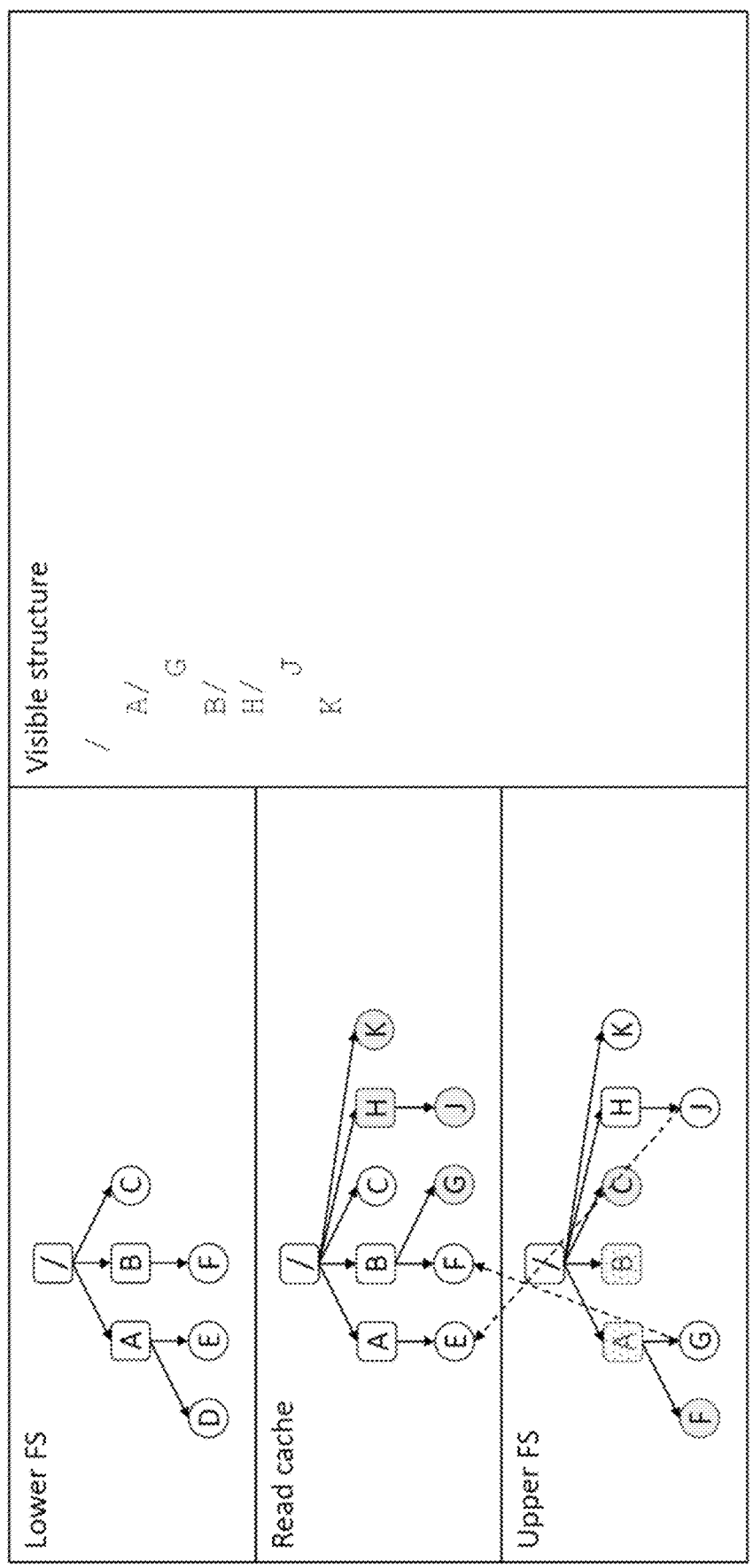
FIG. 3K is a diagram showing a state of the example file system after a directory is created.

FIG. 3K is a diagram showing a state of the example file system after a directory is created. The user interface may receive data indicating a command to create a new B directory. Because a B directory already exists in the read cache, the read cache may remain the same. The upper file system may be updated to indicate that the B directory is no longer deleted. The tree structure of the upper file system may be updated to identify the B directory node has priority to be read from the upper file system instead of the lower file system (e.g., identified as an opaque directory, the B directory must not be read from the lower file system but instead be read from the upper file system).

Figure 3L:
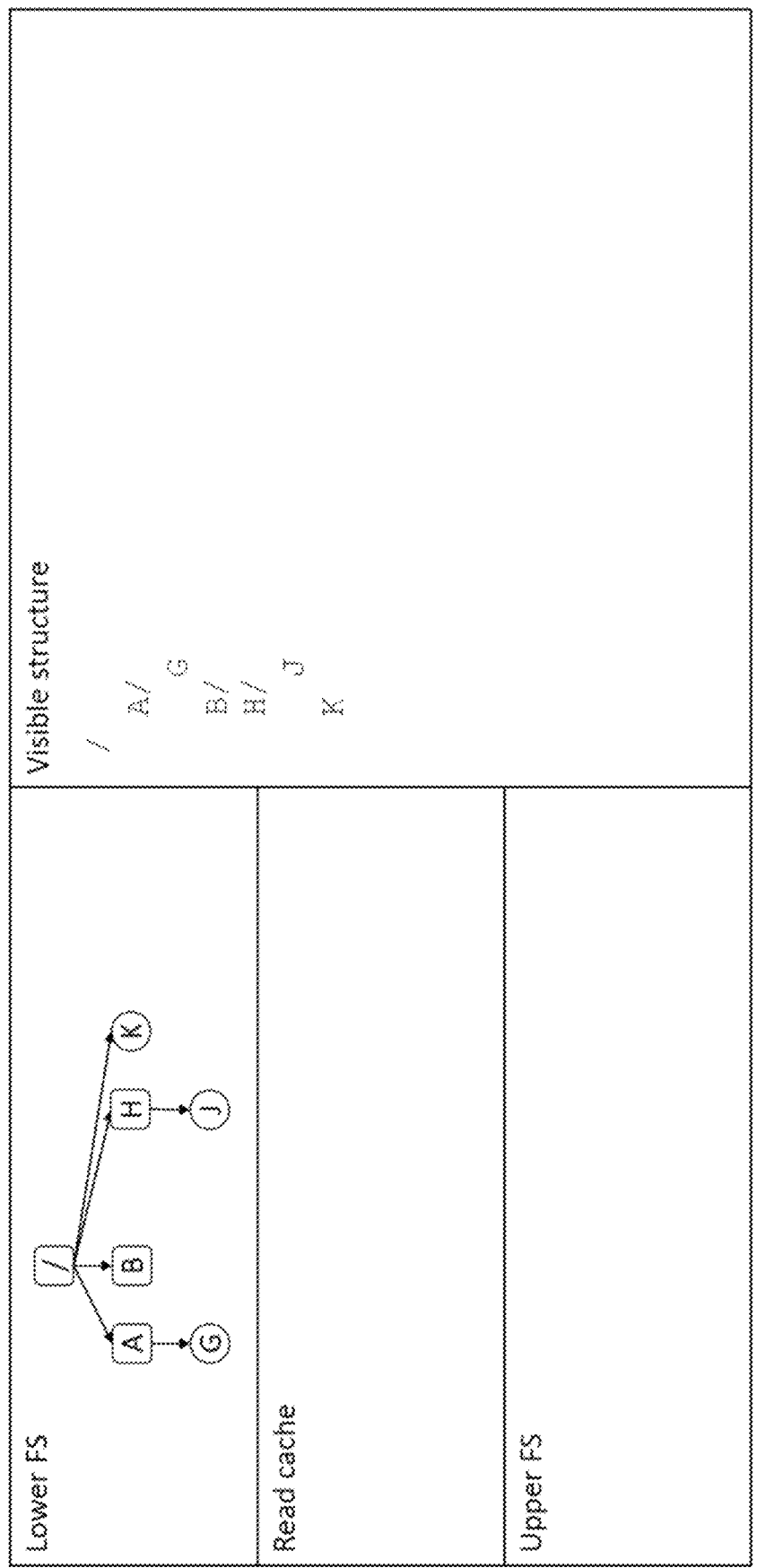
FIG. 3L is a diagram showing a state of the example file system after an upper file system is merged with a lower file system.

FIG. 3L is a diagram showing a state of the example file system after an upper file system is merged with a lower file system. The user interface may receive data indicating a command to save the changes to the file system (e.g., to the project, to the package). The upper file system may be sent from a computing device comprising the user interface to an update service external to the computing device (e.g., a remote server). The update service may be configured to the lower file system to reflect the changes indicated in the upper file system. The update service may use the upper file system (e.g., tree structure of the upper file system) to perform all the operations received by the user interface. The operations may be performed to the lower file system in the same order that the operations were performed in the user interface. The ordering of the operations may be stored (e.g., and sent to the update service). Each of the nodes in the tree structure of the upper file system comprise ordering information (e.g., an operation number, an epoch number) indicating an order of the operations.

Figure 4:
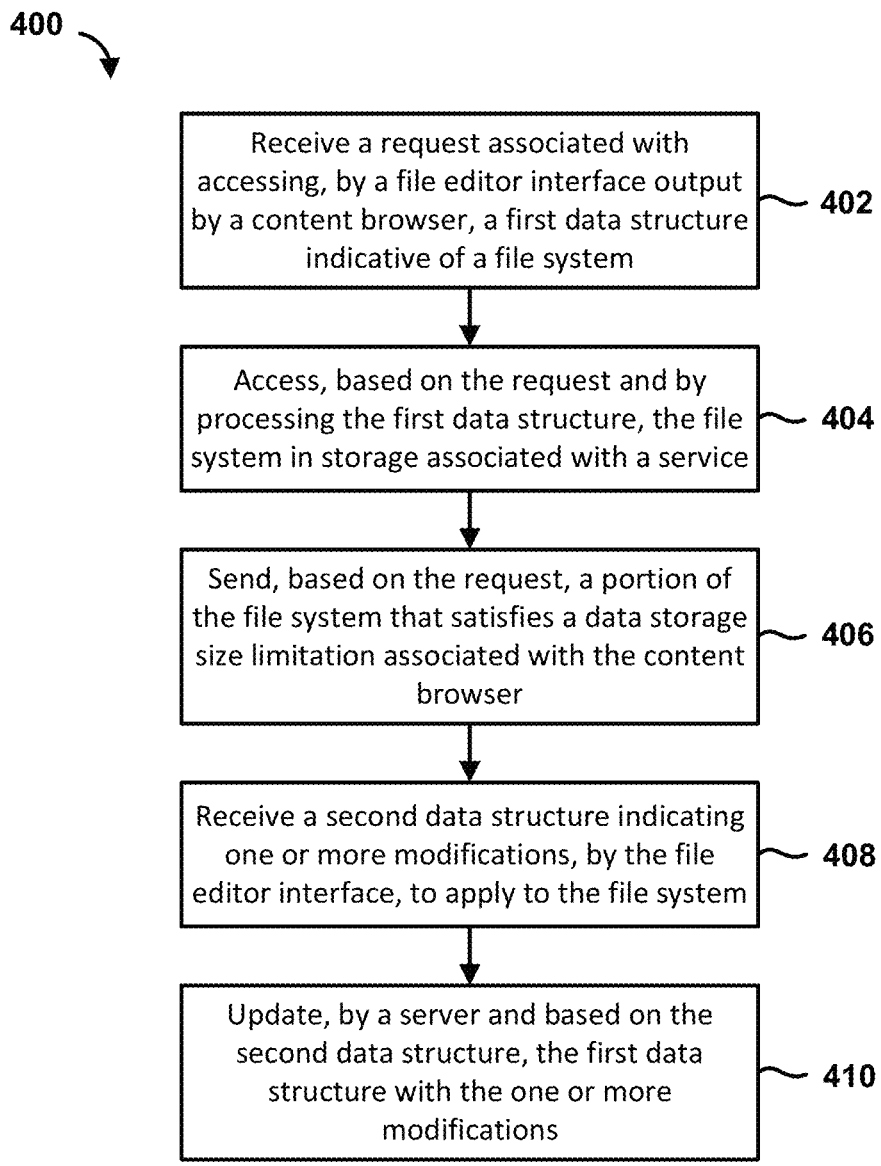
FIG. 4 is a flowchart showing an example method.

FIG. 4 is a flowchart showing an example method 400. The method 400 may comprise a computer implemented method for providing an editor service to a constrained environment. A system and/or computing environment, such as the system 100 of FIG. 1, the system 200 of FIG. 2, the computing environment of FIG. 6, and/or the computing system of FIG. 7 may be configured to perform the method 400.

Operation 402 depicts receiving a request associated accessing a first data structure. The request may be received from a computing device. The computing device may comprise a content browser. The content browser may be associated with a data storage size limitation (e.g., or other resource limitation). The request may be associated with accessing by a file editor interface output by the content browser, the first data structure. The first data structure may be indicative of a file system comprising a directory of one or more files stored by a service.

The service may comprise a service for hosting computer-readable instructions for hosting web-based services. The file editor interface may be an integrated development environment for editing the computer-readable instructions. The file editor interface may comprise a cloud based user interface accessed by a web browser. The file editor interface may allow navigation (e.g., showing directories and files that can be opened and/or edited) of the file system without locally storing the file system.

Operation 404 depicts accessing, based on the request, the file system. The file system may be accessed based on processing the first data structure. Processing the data structure may comprise unpackaging, unzipping, uncompressing, decrypting, navigating, and/or the like the first data structure. The file system (e.g., and the first data structure) may be accessed in storage associated with the service. The storage may be in a data center or other location geographically remote from a location computing device. The storage may be stored in one or more premises external to a premises where the computing device is located.

The file editor interface may have read-only access to the first data structure. The file editor interface may be unable to locally store a full copy of the first data structure (e.g., or the full file system) due to the data storage size limitation.

Operation 406 depicts sending, based on the request, a portion of the file system that satisfies the data storage size limitation. The portion of the file system may be determined based on accessing the file system. The portion of the file system may be sent to the computing device. The portion of the directory may comprise one or more of a portion of a data file, a data file, a directory, or a set of data files in the first data structure that satisfies the data storage size limitation. A determination may be made as to whether the requested portion of the file system (e.g., or first data structure) satisfies the data storage size limitation. If the requested portion does not satisfy the limitation, then only a portion of the requested portion may be sent. If multiple files are requested (e.g., or a directory is requested), then only a portion of the files may be sent. If a single requested file does not satisfy the limitation, then the file may be processed by compressing, unpackaging, fragmenting, and/or the like the file to meet the limitation. The file may be converted to a file stream. As different portions of the file are navigated to by the user interface, the different portions of the file may be streamed as fragments of the original file. The fragments may be discarded by the user interface to allow for additional fragments.

Operation 408 depicts receiving, from the computing device, a second data structure data indicating one or more modifications the portion of the file system. The data indicating the one or more modifications may be data modifications to apply to the file system (e.g., as stored in the first structure). The modification may be caused (e.g., or indicated by) the file editor interface. The second data structure may comprise a version of the file system stored in local storage of the content browser. The second data structure may be limited to storing portions of the file system modified by the one or more modifications.

The second data structure may comprise an updated hierarchical data structure indicating relationships of at least one file and at least one directory. The data indicating the one or more modifications may comprise a modified version of a file and/or directory (e.g., of the file system). The data indicating the one or more modifications may comprise a node (e.g., or entry) added to the updated hierarchical data structure to indicate the change. The node may comprise a file or a representation of at least a portion of the file that is modified. The node may comprise a directory, a representation of a directory, or a representation of a change to a directory (e.g., a change in its location may be indicated by an updated association and/or descendancy information).

Operation 410 depicts updating, by a server, the first data structure with the one or more modifications. The server may have write access to the first data structure. Updating the first data structure may be based on the second data structure. Updating the first data structure may be based on comparing the second data structure (e.g., an updated hierarchical data) structure to the first data structure (e.g., which may be an original hierarchical data structure associated with the file system). The second data structure may comprise ordering information indicating an order in which each update was made. The second data structure may be processed in an order based on the ordering information to update the first data structure. Updating the file system may comprises processing the first data structure by unpackaging, unzipping, decrypting, decompressing, and/or the like the first data structure. The presence of a node and/or other entry in the second data structure may be interpreted by the server as an indication that the file system (e.g., or a corresponding original node) is updated. The server may compare properties (e.g., or fields) of the node as in the second data structure to properties of a corresponding node in the second data structure. If a node had a different property (e.g., changed name, indicated as deleted, changed directory location, changed size, changed checksum), then an operation may be performed to update the original node in the first data structure (e.g., such as deleting the node, renaming the node, moving the node, replacing the node with the updated node).

Figure 5:
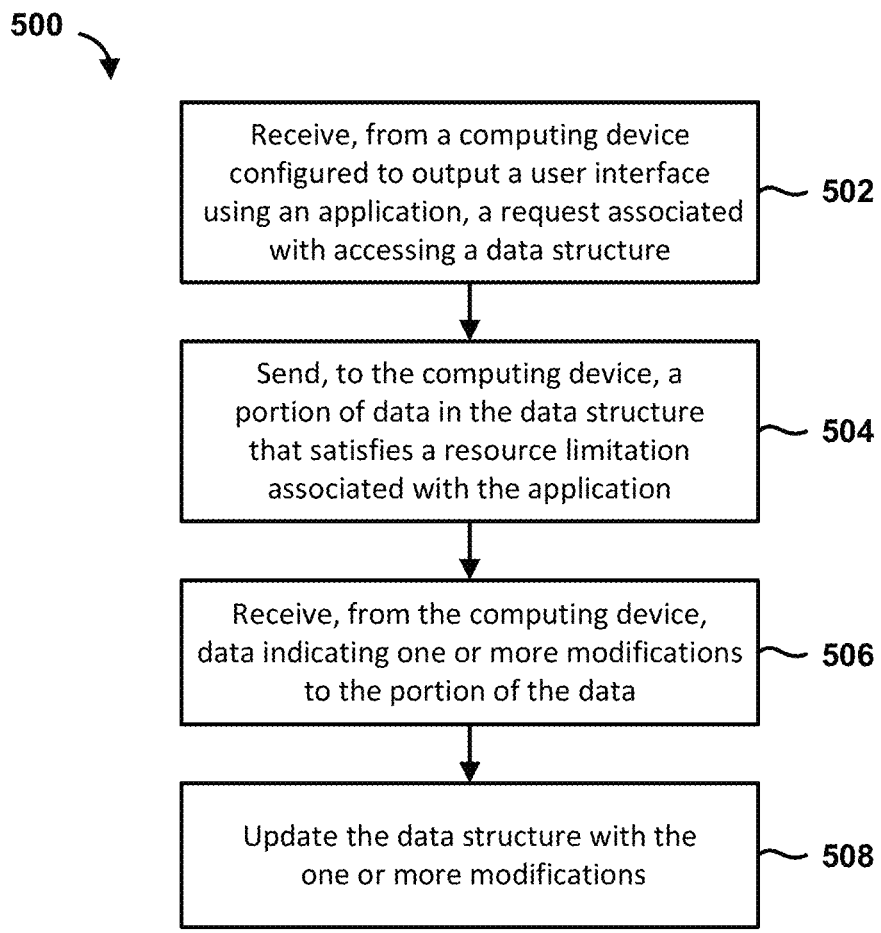
FIG. 5 is a flowchart showing an example method.

FIG. 5 is a flowchart showing an example method 500. The method 500 may comprise a computer implemented method for providing an editor service to a constrained environment. A system and/or computing environment, such as the system 100 of FIG. 1, the system 200 of FIG. 2, the computing environment of FIG. 6, and/or the computing system of FIG. 7 may be configured to perform the method 500.

Operation 502 depicts receiving, from a computing device configured to output (e.g., execute, display) a user interface using an application, a request. The request may be associated with accessing, by the user interface, a data structure.

The data structure may comprise one or more files stored by a service external to the user interface (e.g., located at a remote location, located at a different premises than the computing device, located in a remote data center). The service may comprise a service for storing computer-readable instructions for hosting web-based services. The user interface may be an integrated development environment for editing the computer-readable instructions. The user interface may comprise one or more of an integrated development environment, a web-based file editor interface accessed by a web browser, or user interface accessed by a content browser. The user interface may comprise a file editor interface as described further herein.

The application (e.g., or the computing device) may be associated with a resource limitation, such as a processing limitation, a storage limitation, a bandwidth limitation, a power limitation (e.g., power level, power mode), or a combination thereof. The resource limitation may comprise a limit on an amount of data that can be stored by a web browser (e.g., or other content browser or application) outputting the user interface. The user interface may have read-only access to the data structure. A server located external to a computing device comprising the user interface may be configured to update the data structure.

Operation 504 depicts sending, to the computing device (e.g., to the application and/or user interface) and based on the request, a portion of data in the data structure that satisfies the resource limitation. The portion of the data in the data structure may comprise one or more of a portion of a data file, a data file, directory, or a set of data files in the data structure that satisfies the resource limitation.

The user interface may be configured to emulate access to the data structure without storing the entire data structure. Emulation may comprise displaying a representation the data structure that shows modification to files and/or directories of the data structure (e.g., while only storing the files that have been read, while only storing the directories and/or files that have been modified). Emulation may comprise storing accessed files and/or directories in non-persistent storage (e.g., in memory) while storing only the files and/or directories that have been modified in local persistent storage. Emulation may comprise representing (e.g., via the user interface) the entire data structure (e.g., all its nodes, directories, files) on the user interface while only storing in local persistent storage portions of the data structure that have been modified (e.g., moved, edited, renamed, deleted). Emulation may comprise storing (e.g., in local persistent storage) only the nodes in a tree data structure (e.g., or trie data structure, or other data structure) that have been modified (e.g., moved, edit, renamed, deleted). Emulation may comprise representing, via the user interface, the data structure as storing a modified state before the original data structure is updated to store the modified state.

Operation 506 depicts receiving, from the computing device (e.g., from the application, user interface), data indicating one or more modifications to the portion of the data. The data indicating the one or more modifications may be received based on one or more of a time threshold, a data threshold, or user input indicative of a save action. The data indicating the one or more modifications to the portion of the data may comprise a trie data structure indicating a change in one or more of a file or a directory. The data indicating one or more modifications to the portion of the data may indicate one or more of an additional of a file, a deletion of a file, or a change to a directory structure.

Operation 508 depicts updating the data structure with the one or more modifications. Updating the data structure may comprising merging changes from an upper layer data structure to a lower layer data structure. The upper layer data structure may comprise only the portion of the nodes, files, and/or directories from the lower layer data structure that have been modified. The data indicating the one or more modifications may comprise an updated hierarchical data structure indicating relationships of at least one file and at least one directory. The data structure may be updated based on comparing the updated hierarchical data structure to an original hierarchical data structure associated with the data structure.

FIG. 6 illustrates an example computing environment in which the embodiments described herein may be implemented. The example computing environment of FIG. 6 may be configured to implement one or more of the services platform, the editor service 102, the content service 104, the, the processing service 106, the storage service 108, or a combination thereof of FIG. 1. The example computing environment of FIG. 6 may be configured to implement the web application 206, the update service 216, the first storage service 202, the second storage service 204, or a combination thereof of FIG. 2. The example computing environment of FIG. 6 may be configured to implement any of the methods described herein, such as any methods (e.g., or any operations) associated with FIGS. 1, 2, 3A-L, 4, and 5.

FIG. 6 is a diagram schematically illustrating an example of a data center 610 that can provide computing resources to users 600a and 600b (which may be referred herein singularly as user 600 or in the plural as users 600) via user computers 602a and 602b (which may be referred herein singularly as computer 602 or in the plural as computers 602) via a communications network 630. Data center 610 may be configured to provide computing resources for executing applications on a permanent or an as-needed basis. The computing resources provided by data center 610 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 610 may include servers 616a-b (which may be referred herein singularly as server 616 or in the plural as servers 616) that provide computing resources. These resources may be available as bare metal resources, or as virtual machine instances 618a-d and (which may be referred herein singularly as virtual machine instance 618 or in the plural as virtual machine instances 618). Virtual machine instances 618c and 618d can be editor service virtual machine instances. The editor service virtual machine instances 618c and 618d may be configured to perform all or any portion of the editor services in accordance with the present disclosure and described in detail herein. As should be appreciated, while the particular example illustrated in FIG. 6 includes one editor service virtual machine in each server, this is merely an example. A server may include more than one editor service virtual machine or may not include any editor service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by users 600 or other customers of data center 610. For instance, user computer 602a or 602b may be a server, a desktop or laptop personal computer, a tablet computer, a wireless telephone, a personal digital assistant (PDA), an e-book reader, a game console, a set-top box or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620a or 620b (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616a and 616b. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616a and 616b. While FIG. 6 depicts router 614 positioned between gateway 640 and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
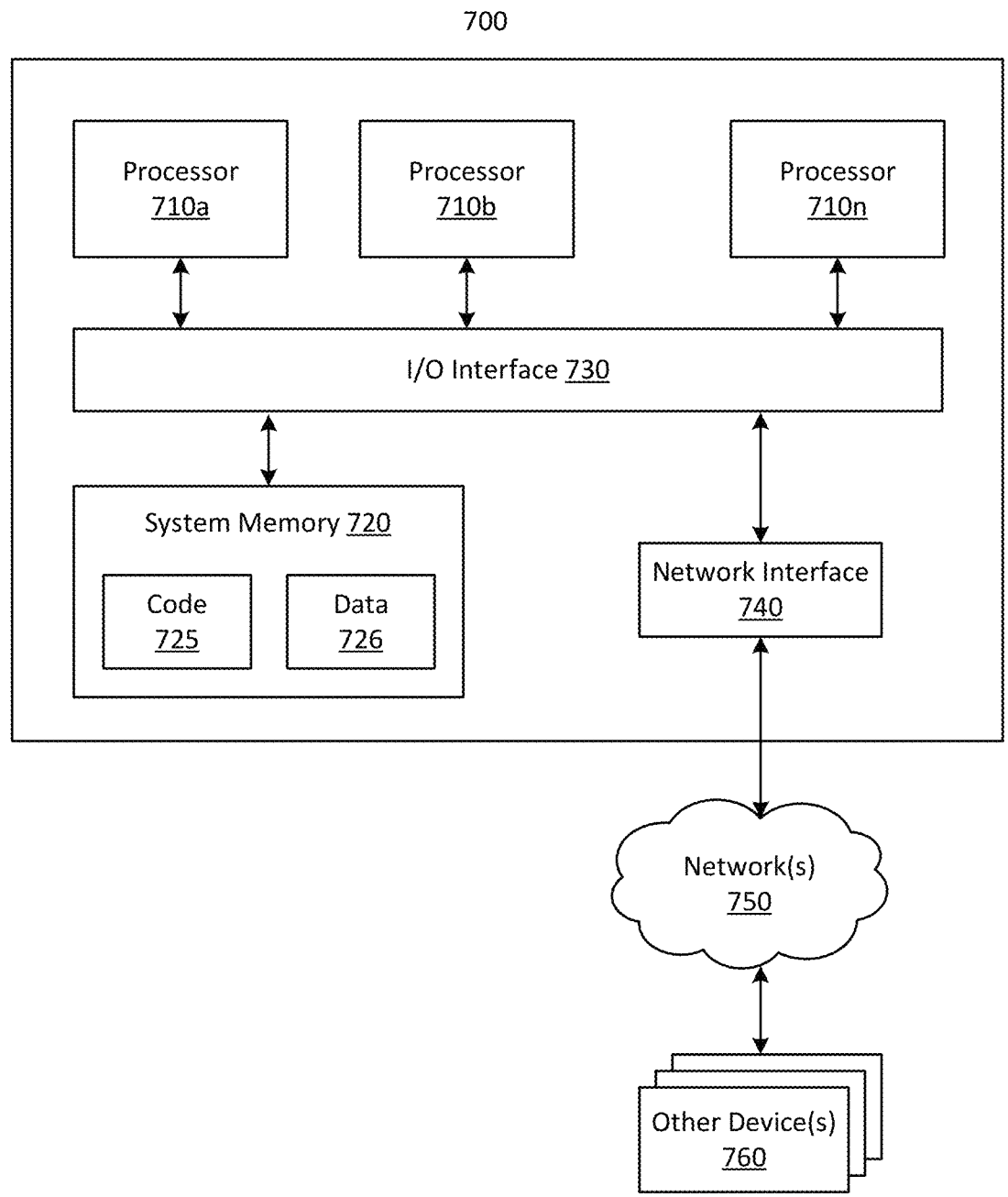
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. The example computer system of FIG. 7 may be configured to implement one or more of the services platform, the editor service 102, the content service 104, the, the processing service 106, the storage service 108, or a combination thereof of FIG. 1. The example computer system of FIG. 7 may be configured to implement the web application 206, the update service 216, the first storage service 202, the second storage service 204, or a combination thereof of FIG. 2. The example computer system of FIG. 7 may be configured to implement any of the methods described herein, such as any methods (e.g., or any operations) associated with FIGS. 1, 2, 3A-L, 4, and 5.

In the illustrated embodiment, computing device 700 includes one or more processors 710*a*, 710*b* and/or 710*n* (which may be referred herein singularly as "a processor 710" or in the plural as "the processors 710") coupled to a system memory 720 via an input/output (I/O) interface 730. Computing device 710 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 720 or another type of memory. Further, a computer-accessible medium may include transmission media or signals such as electrical, electromagnetic or digital signals conveyed via a communication medium such as a network and/or a wireless link, such as those that may be implemented via network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising one or more memories having instructions thereon that, upon execution, at least cause the system to:
   receive, from a computing device configured to output a user interface using an application associated with a resource limitation, a request associated with accessing, by the user interface, a data structure comprising one or more files stored by a service external to the user interface;
   send, to the computing device and based on the request, a portion of data in the data structure that satisfies the resource limitation, wherein the user interface is configured to emulate access to the data structure without storing the entire data structure;
   receive, from the computing device, data indicating one or more modifications to the portion of the data; and
   update the data structure with the one or more modifications.

2. The system of claim 1, wherein the portion of the data in the data structure comprises one or more of a portion of a data file, a data file, a directory, or a set of data files in the data structure that satisfies the resource limitation.

3. The system of claim 1, wherein the user interface comprises one or more of an integrated development environment, a web-based file editor interface accessed by a web browser, or a user interface accessed by a content browser.

4. The system of claim 1, wherein the data indicating the one or more modifications comprises an updated hierarchical data structure indicating relationships of at least one file and at least one directory, and wherein updating the data structure is based on comparing the updated hierarchical data structure to an original hierarchical data structure associated with the data structure.

5. The system of claim 1, wherein the service comprises a service for storing computer-readable instructions for hosting web-based services, and wherein the user interface is an integrated development environment for editing the computer-readable instructions.

6. The system of claim 1, wherein the system is configured to receive the data indicating the one or more modifications based on one or more of a time threshold, a data threshold, or user input indicative of a save action.

7. The system of claim 1, wherein the data indicating the one or more modifications to the portion of the data comprise a trie data structure indicating a change in one or more of a file or a directory.

8. The system of claim 1, wherein the data indicating one or more modifications to the portion of the data indicates one or more of an additional of a file, a deletion of a file, or a change to a directory structure.

9. The system of claim 1, wherein the resource limitation comprises a limit on an amount of data that is storable by a web browser outputting the user interface.

10. The system of claim 1, wherein the user interface has read-only access to the data structure, and a server located external to a computing device comprising the user interface is configured to update the data structure.

11. A non-transitory computer-readable storage medium having stored thereon computer-readable instructions, the computer-readable instructions comprising instructions that, upon execution on one or more computing devices, at least cause:
   receiving, from a computing device configured to output a user interface using an application associated with a resource limitation, a request associated with accessing, by the user interface, a data structure comprising one or more files stored by a service external to the user interface;
   sending, to the computing device and based on the request, a portion of data in the data structure that satisfies the resource limitation, wherein the user interface is configured to emulate access to the data structure without storing the entire data structure;
   receiving, from the computing device, data indicating one or more modifications to the portion of the data; and
   updating the data structure with the one or more modifications.

12. The computer-readable storage medium of claim 11, wherein the portion of the data in the data structure comprises one or more of a portion of a data file, a data file, a directory, or a set of data files in the data structure that satisfies the resource limitation.

13. The computer-readable storage medium of claim 11, wherein the user interface comprises one or more of an integrated development environment, a web-based file editor interface accessed by a web browser, or user interface accessed by a content browser.

14. The computer-readable storage medium of claim 11, wherein the data indicating the one or more modifications comprises an updated hierarchical data structure indicating relationships of at least one file and at least one directory, and wherein updating the data structure is based on comparing the updated hierarchical data structure to an original hierarchical data structure associated with the data structure.

15. The computer-readable storage medium of claim 11, wherein the service comprises a service for storing computer-readable instructions for hosting web-based services, and wherein the user interface is an integrated development environment for editing the computer-readable instructions.

16. A computer-implemented method comprising:
   receiving, from a computing device configured to output a user interface using an application associated with a resource limitation, a request associated with accessing, by the user interface, a data structure comprising one or more files stored by a service external to the user interface;
   sending, to the computing device and based on the request, a portion of data in the data structure that satisfies the resource limitation, wherein the user interface is configured to emulate access to the data structure without storing the entire data structure;
   receiving, from the computing device, data indicating one or more modifications to the portion of the data; and
   updating the data structure with the one or more modifications.

17. The computer-implemented method of claim 16, wherein the portion of the data in the data structure comprises one or more of a portion of a data file, a data file, a directory, or a set of data files in the data structure that satisfies the resource limitation.

18. The computer-implemented method of claim 16, wherein the user interface comprises one or more of an integrated development environment, a web-based file editor interface accessed by a web browser, or user interface accessed by a content browser.

19. The computer-implemented method of claim 16, wherein the data indicating the one or more modifications comprises an updated hierarchical data structure indicating relationships of at least one file and at least one directory, and wherein updating the data structure is based on comparing the updated hierarchical data structure to an original hierarchical data structure associated with the data structure.

20. The computer-implemented method of claim 16, wherein the service comprises a service for storing computer-readable instructions for hosting web-based services, and wherein the user interface is an integrated development environment for editing the computer-readable instructions.

* * * * *